(12) United States Patent
Kadziolka et al.

(10) Patent No.: US 7,654,404 B2
(45) Date of Patent: Feb. 2, 2010

(54) PROTECTIVE DOOR SYSTEM FOR ENCLOSURES RESISTANT TO HIGH INTERNAL PRESSURES

(75) Inventors: Joseph S. Kadziolka, Cambridge (CA); Murray Peter Kingston, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 398 days.

(21) Appl. No.: 11/770,149

(22) Filed: Jun. 28, 2007

(65) Prior Publication Data

US 2008/0092449 A1    Apr. 24, 2008

Related U.S. Application Data

(60) Provisional application No. 60/853,238, filed on Oct. 21, 2006.

(51) Int. Cl.
B65D 43/22 (2006.01)
B65D 43/26 (2006.01)
B65D 55/02 (2006.01)

(52) U.S. Cl. .................. 220/211; 220/259.2; 220/263; 220/810

(58) Field of Classification Search .............. 220/211, 220/259.1, 259.2, 263, 323, 810, 4.02
See application file for complete search history.

(56) References Cited

U.S. PATENT DOCUMENTS

| | | | |
|---|---|---|---|
| 3,386,203 A * | 6/1968 | Butler et al. | 49/210 |
| 3,490,641 A * | 1/1970 | Beecher | 220/211 |
| 4,489,810 A * | 12/1984 | Curtis | 312/272.5 |
| 4,769,739 A | 9/1988 | DeBruin | |
| 4,815,237 A | 3/1989 | Dizon et al. | |
| 4,864,466 A | 9/1989 | Gasparetto | |
| 5,905,244 A | 5/1999 | Smith et al. | |
| 6,081,968 A | 7/2000 | Walker et al. | |
| 6,106,035 A | 8/2000 | Hetherington | |
| 6,357,804 B1 | 3/2002 | Bernier et al. | |
| 6,409,064 B1 * | 6/2002 | Bayley | 224/404 |
| 6,561,604 B2 | 5/2003 | Leccia et al. | |
| 6,642,446 B2 * | 11/2003 | Dodds et al. | 174/50 |
| 6,746,092 B2 | 6/2004 | Leccia et al. | |

* cited by examiner

Primary Examiner—Anthony Stashick
Assistant Examiner—Niki M Eloshway
(74) Attorney, Agent, or Firm—Fay Sharpe LLP; William R. Walbrun

(57) ABSTRACT

Protective door systems are presented for equipment enclosures in which an inner door is provided to resist outward opening pressures by facing or abutting one or more interior surfaces of an enclosure opening, with an optional outer panel covering the enclosure opening from the outside, where a closure mechanism is operated by an externally rotatable handle to initially back the inner door away from the enclosure front side and then to move the inner door upward at an angle to effectively clear two edges of the opening to allow pivoting of the inner door to an open position extending partially outside the enclosure opening.

18 Claims, 21 Drawing Sheets

PROTECTIVE DOOR SYSTEM FOR ENCLOSURES RESISTANT TO HIGH INTERNAL PRESSURES

REFERENCE TO RELATED APPLICATION

This application claims priority to and the benefit of U.S. Provisional Patent Application Ser. No. 60/853,238, filed Oct. 21, 2006, entitled PROTECTIVE DOOR SYSTEM FOR ENCLOSURES RESISTANT TO HIGH INTERNAL PRESSURES, the entirety of which is hereby incorporated by reference.

FIELD OF THE INVENTION

The present invention relates generally to protective enclosures and more particularly to electrical enclosures with protective door systems resistant to high internal pressures. Motor controllers are employed in association with electrical motors and other applications in which electrical power is converted for driving electric motors or other loads. Motor controllers and other electrical systems are typically housed in cabinets to protect the system components from dirt or other contaminants as well as to prevent exposure of operating personnel to high voltages and currents present inside the cabinet. Electrical equipment generally includes transformers, contactors, switches, and other power electronic devices that may have exposed terminals carrying high current and which may be at hundreds or even thousands of volts potential with respect to ground. In general, closed cabinetry serves to prevent inadvertent contact by operators or other personnel with live components of motor controllers and other power conversion systems during normal system operation. In certain applications, moreover, the protective enclosures may also serve to prevent exposure of internal components during situations in which the pressure in the enclosure interior is raised, such as high internal pressures resulting from arcing conditions. The system enclosure or cabinet typically includes a hinged door that provides selective access to the interior with one or more sliding rods that direct steel pins into corresponding holes in steel brackets of the enclosure, or a latch with a sliding steel bracket having hooked teeth to engage corresponding slots in the enclosure. However, these conventional latching systems must be precise to ensure proper insertion of the steel pins or bracket teeth into the mating holes or slots to successfully oppose internal opening pressures on the cabinet door, where these requirements add cost during manufacturing and thereafter, including the necessary alignment of the latching system during production and in subsequent maintenance in order to ensure proper operation. Thus, there remains a need for improved electrical system enclosures with protective door apparatus to resist high internal cabinet pressures without adding significant cost or maintenance.

SUMMARY

Various aspects of the present disclosure are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure provides protective door systems for enclosures used in motor control and other arc resistant switchgear equipment applications, which may be successfully employed for improved resistance to high internal pressures while being easy to operate and without requiring re-adjustment by an end-user. The disclosed door systems may thus provide cost advantages over conventional enclosure door systems without requiring high precision latching components and without necessitating adjustment, in which the protective door system does not rely upon a latching mechanism to resist internal pressures. The disclosed enclosures and protective door systems, rather, employ an inner door that seats against or faces interior surfaces along two or more edges of the cabinet opening to provide the desired resistance to opening under force of internal pressures. By this arrangement, the door is self sealing with internal rising pressure operating to press the inner door to further close/seal the enclosure. This approach further mitigates or avoids the need for precision or high-strength latching mechanisms and adjustments found in conventional designs.

One or more aspects of the present disclosure relate to an enclosure such as an arc resistant electrical cabinet, electrical equipment located inside the enclosure, and a protective door system for selectively covering and uncovering a doorway or other enclosure opening. The enclosure has a top, a bottom, and a plurality of sides including a front side with inner and outer faces and a rectangular opening comprising four edges and providing access to the interior of the enclosure. The protective door system includes an inner door and a closure mechanism pivotally connected to the enclosure proximate an edge of the enclosure opening for pivotal movement between a closed position in which the inner door is positioned inside the interior and an open position in which at least a portion of the inner door is pivoted through the opening to extend at least partially outside the enclosure. The closure mechanism provides an externally mounted handle that is movable between first and second handle positions when the closure mechanism is in its closed position. In the first handle position, the closure mechanism positions the inner door such that portions of the front face of the inner door face or abut portions of the inner face of the enclosure front side along three of the four edges of the opening to inhibit outward movement of the inner door. Thus, with the closure mechanism closed and the handle in the first position, high internal pressures will be met with a positive interference that does not allow the inner door to move outward.

As the handle is moved to the second handle position the closure mechanism translates the inner door away from the inner face of the enclosure front side and further translates the inner door laterally and vertically so that the inner door faces the inner face of the enclosure front side along only one edge of the opening. This allows the closure mechanism to be pivoted to the open position with a portion of the inner door pivoting through the opening to extend at least partially outside the enclosure. The protective door system may further include a closing member slidably mounted near the fourth side of the opening with a grab handle to slide the closing member from a first position in which a portion of closing member faces or abuts a portion of the front face of the inner door to a second position where the inner door clears the closing member. The closing member may thus be brought to the first position to cover the fourth side of the enclosure opening, and may then be slid out of the way to allow the inner door to be pivoted open. The closure mechanism, moreover, may include an outer panel that pivots between a closed position with portions of the outer panel facing or abutting portions of the outer face of the enclosure front side along the four edges of the opening, and an open position away from the enclosure front side to allow access to the enclosure interior through the opening.

Further aspects of the disclosure relate to protective door systems for allowing selective access to an interior of an enclosure by covering or uncovering an opening in a front side of the enclosure. The system includes an inner door having front and rear faces, and a closure mechanism operatively coupled to the inner door and pivotally connected to the enclosure to pivot between a closed position in which the inner door is positioned inside the interior and an open position in which at least a portion of the inner door is pivoted through the opening to extend at least partially outside the enclosure. The closure mechanism includes an externally mounted handle movable between a first handle position with the inner door facing or abutting portions of the inner face of the enclosure front side along three of four edges to inhibit outward movement of the inner door, and a second handle position to translate the inner door away from the inner face of the enclosure front side and to translate the inner door laterally and vertically such that the front face of the inner door faces the inner face of the enclosure front side along only one edge of the opening. The door system further includes a closing member slidably mounted to the enclosure proximate the fourth edge of the opening, and a grab handle coupled to the closing member. The grab handle is operable when the closure mechanism is in the closed position to slide the closing member from a first closing member position in which a portion of closing member faces or abuts a portion of the front face of the inner door to a second position in which the inner door clears the closing member to allow the inner door to pivot through the opening as the closure mechanism is pivoted from the closed position to the open position. The closure mechanism may further comprise an outer panel pivotally movable between the closed position of the closure mechanism in which the outer panel faces or abuts portions of the outer face of the enclosure front side along the four edges of the opening, and the open position with the outer panel pivoted away from the enclosure front side to allow access to the enclosure interior through the opening.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention are set forth in the following detailed description of the invention when considered in conjunction with the drawings, in which.

DETAILED DESCRIPTION

Figure 1A:
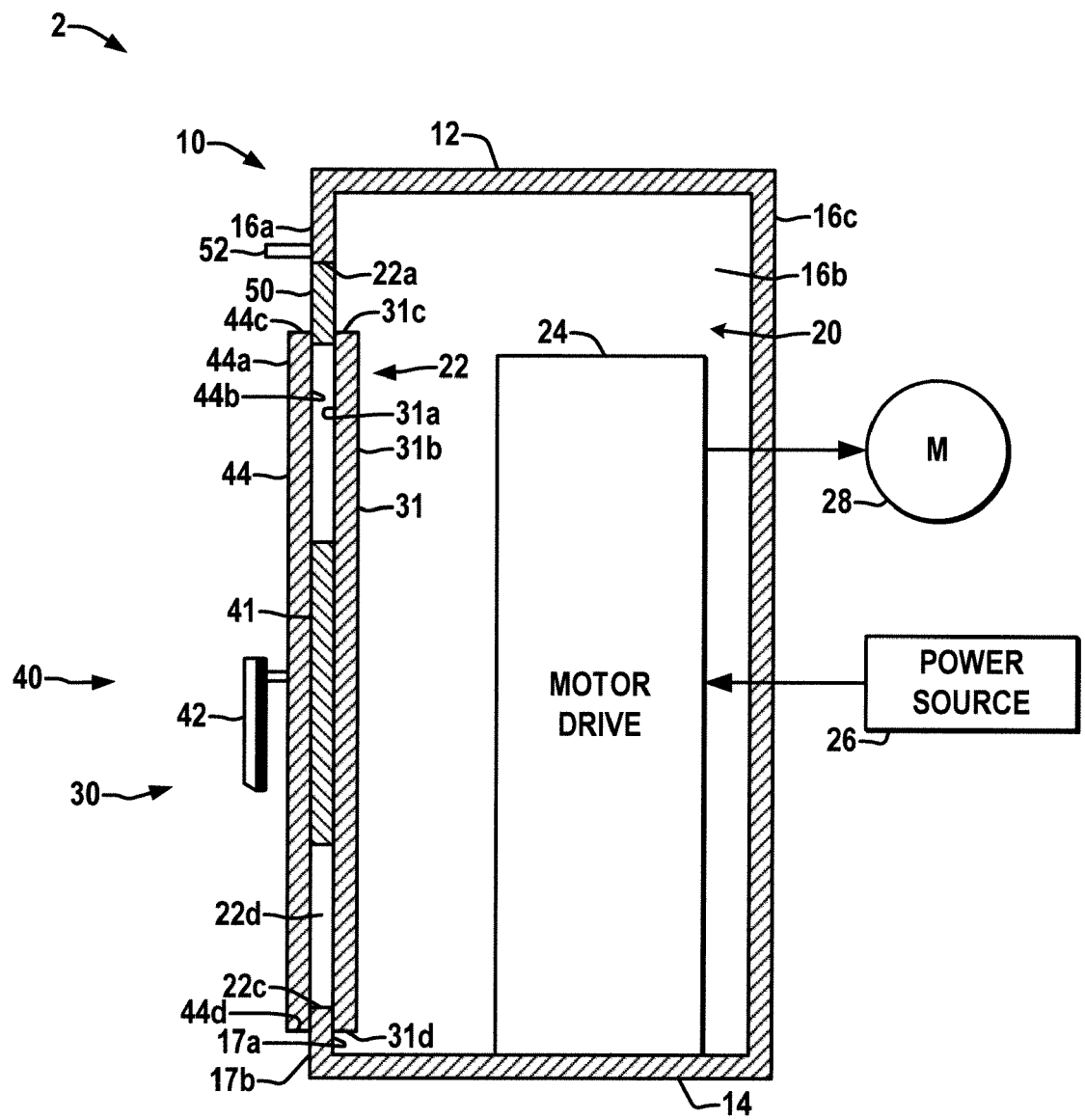
FIG. 1A is a simplified partial sectional side elevation view illustrating an exemplary motor drive system with an enclosure and a protective door system in accordance with one or more aspects of the present disclosure, in which the door system includes inner and outer doors or panels and an upper closure structure in a closed position with the inner door abutting four sides of an enclosure opening.

Referring now to the figures, several embodiments or implementations of the present invention are hereinafter described in conjunction with the drawings, wherein like reference numerals are used to refer to like elements throughout, and wherein the various features are not necessarily drawn to scale. The presently disclosed embodiments provide motor drive systems and protective door systems in which an inner door is provided to resist outward opening pressures by facing or abutting one or more interior surfaces of an enclosure opening, with an optional outer panel covering the enclosure opening from the outside, where a closure mechanism is operated by an externally accessible handle to initially back the inner door away from the enclosure front panel and then to move the inner door upward at an angle to effectively clear two edges of the opening to allow pivoting of the inner door to an open position extending partially outside the enclosure opening.

Referring initially to FIGS. 1A-1F, an exemplary motor drive system 2 is illustrated including an enclosure 10 with a top 12, a bottom 14, and a plurality of sides 16a-16d extending vertically from the top 12 to the bottom 14 and defining an enclosure interior 20. The enclosure front side 16a includes inner and outer faces 17a and 17b, respectively, and a rectangular opening 22 with top, left, bottom, and right edges 22a-22d providing access to the interior 20 of the enclosure 10. The drive system 2 includes a motor drive 24 located within the interior 20 of the enclosure 10 and operative to receive power from an external power source 26 and to operate an external electric motor 28. The enclosure 10 is opened and closed using a protective door system 30 operatively coupled with the enclosure 10 for selectively covering and uncovering the opening 22, while providing protection against undesired opening of the enclosure 10 through elevated pressures in the interior 22. In particular, the door system 30 includes an inner door 31 having front and rear faces 31a and 31b, respectively, as well as an inner door top 31c, bottom 31d, and two sides 31e and 31f.

The inner door is located in a closed position shown in FIG. 1A in which the outer portions of the front face 31a of the inner door 31 face or abut the edges of the enclosure front face 17a along three sides 22b, 22c, and 22d of the opening 22 and the lower edge of a closure member 50 shown in its lowered position in FIG. 1A. The inner door is movable from this closed position as shown in FIGS. 1B-1F via a closure mechanism 40 operatively coupled to the inner door 31. The closure mechanism 40 is pivotally connected to the enclosure 10 proximate the left edge 22d of the opening 20, such as by one or more hinges or other pivotal mounting apparatus, not shown, for pivotal movement of the mechanism 40 between a closed position (e.g., FIGS. 1A-1E) in which the inner door 31 is entirely within the enclosure interior 20 and an open position (e.g., FIG. 1F) in which at least a portion of the inner door 31 is pivoted through the opening 22 to extend at least partially outside the enclosure 10. In one possible embodiment, the inner door 31 is provided with a closure mechanism for translating the inner door 31 alone, as described further hereinafter.

In another possible embodiment shown in FIGS. 1A-1F, the mechanism 40 further includes an outer panel 44 having front and rear faces 41a and 41b, respectively, as well as a top 44c, a bottom 44d, and two sides 44e and 44f. The outer panel 44 in this embodiment is pivotally connected to the enclosure 10 proximate the left edge 22d of the opening 22 for pivotal movement between the closed position (e.g., FIGS. 1A-1E) of the closure mechanism 40 in which portions of the rear face 44b of the outer panel 44 face or abut portions of the outer face 17b of the enclosure front side 16a along the four edges of the opening 22, and the open position of the closure mechanism 40 (e.g., FIG. 1F) in which the outer panel 44 is pivoted away from the enclosure front side 16a to allow access to the enclosure interior 20 through the opening 22.

The closure mechanism 40 includes an externally mounted handle 42 that is rotatably movable between a first (down) position and a second position rotated up approximately 90 degrees when the closure mechanism 40 is in the closed position, wherein other handles 42 may be provided for linear or other type movement between first and second handle positions. When the handle 42 is in the first position (down as shown in FIG. 1A), the closure mechanism 40 positions the inner door 31 such that the lower and side peripheral edge portions of the front face 31a of the inner door 31 face or abut portions of the inner face 17a of the enclosure front side along three of the four edges of the opening 22 to inhibit outward movement of the inner door 31.

Figure 1B:
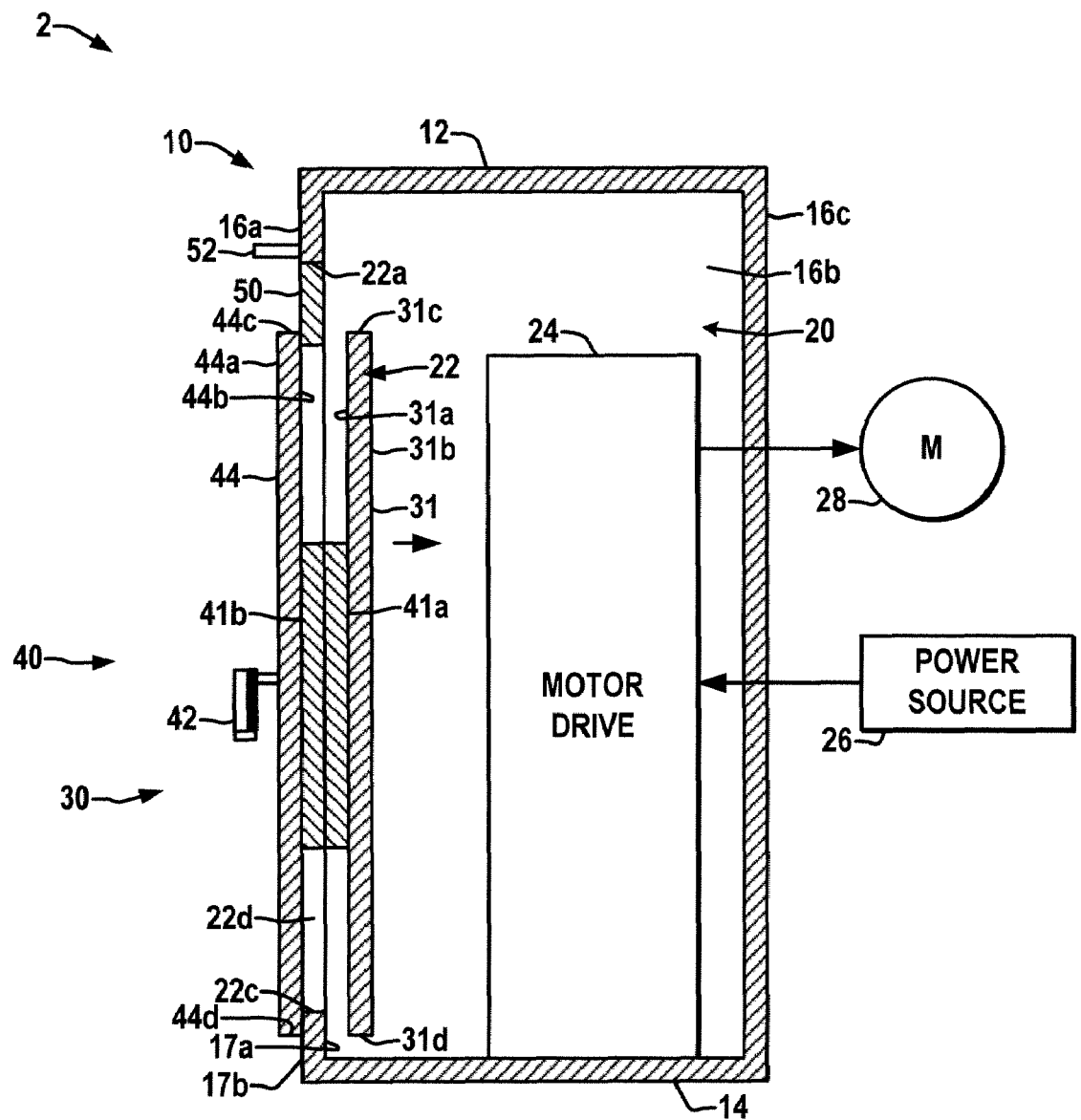
FIG. 1B is a partial sectional side view illustrating the system of FIG. 1A in a second condition with a closure handle rotated partially upward to move the inner door back toward the enclosure interior away from the inner face of the front side of the enclosure.
Figure 1C:
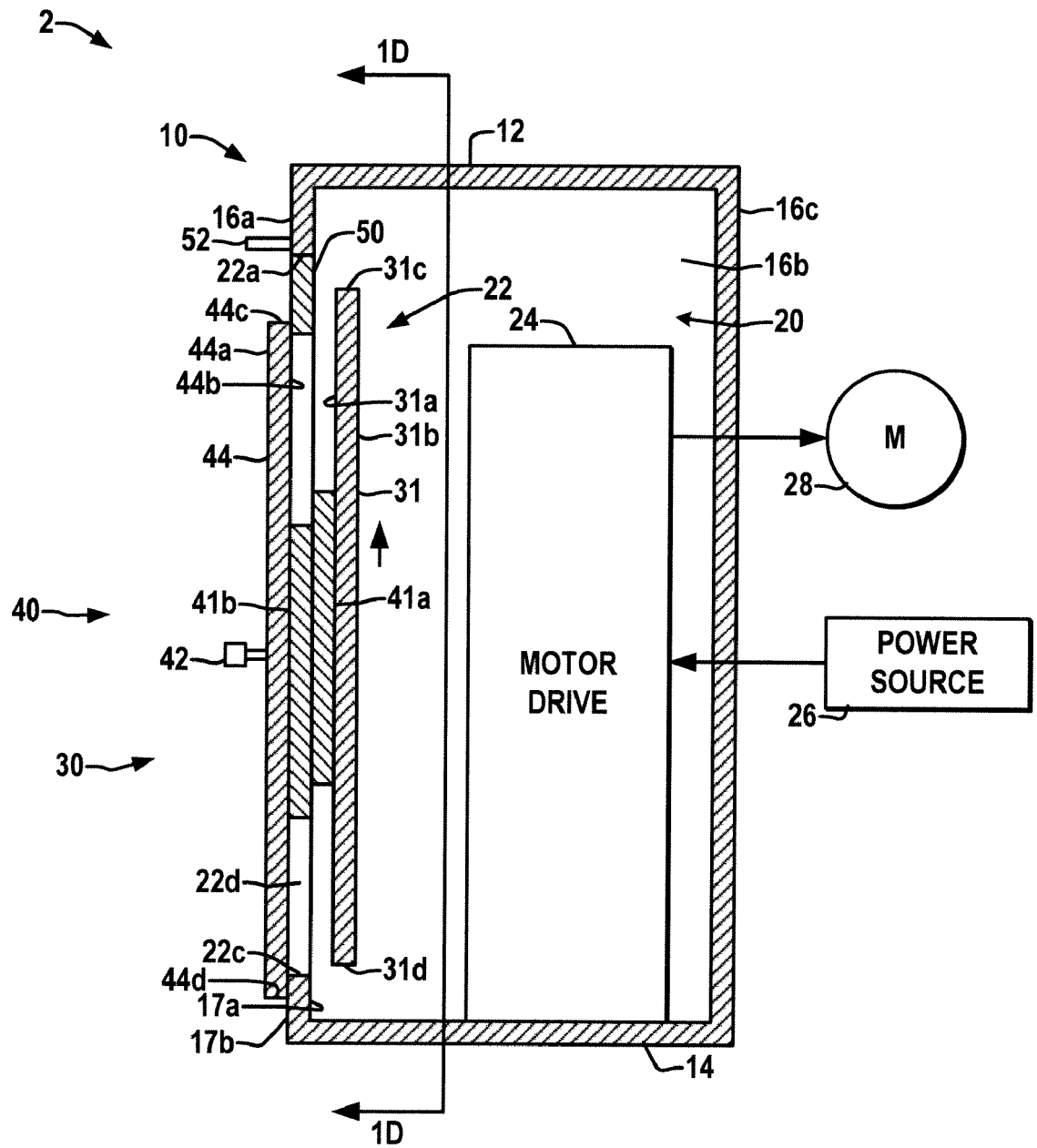
FIGS. 1C and 1D are partial sectional side and rear elevation views illustrating the system of FIGS. 1A and 1B in a third condition with the closure handle rotated fully upward to a second handle position to move the inner door upward and laterally over at an angle.
Figure 1D:
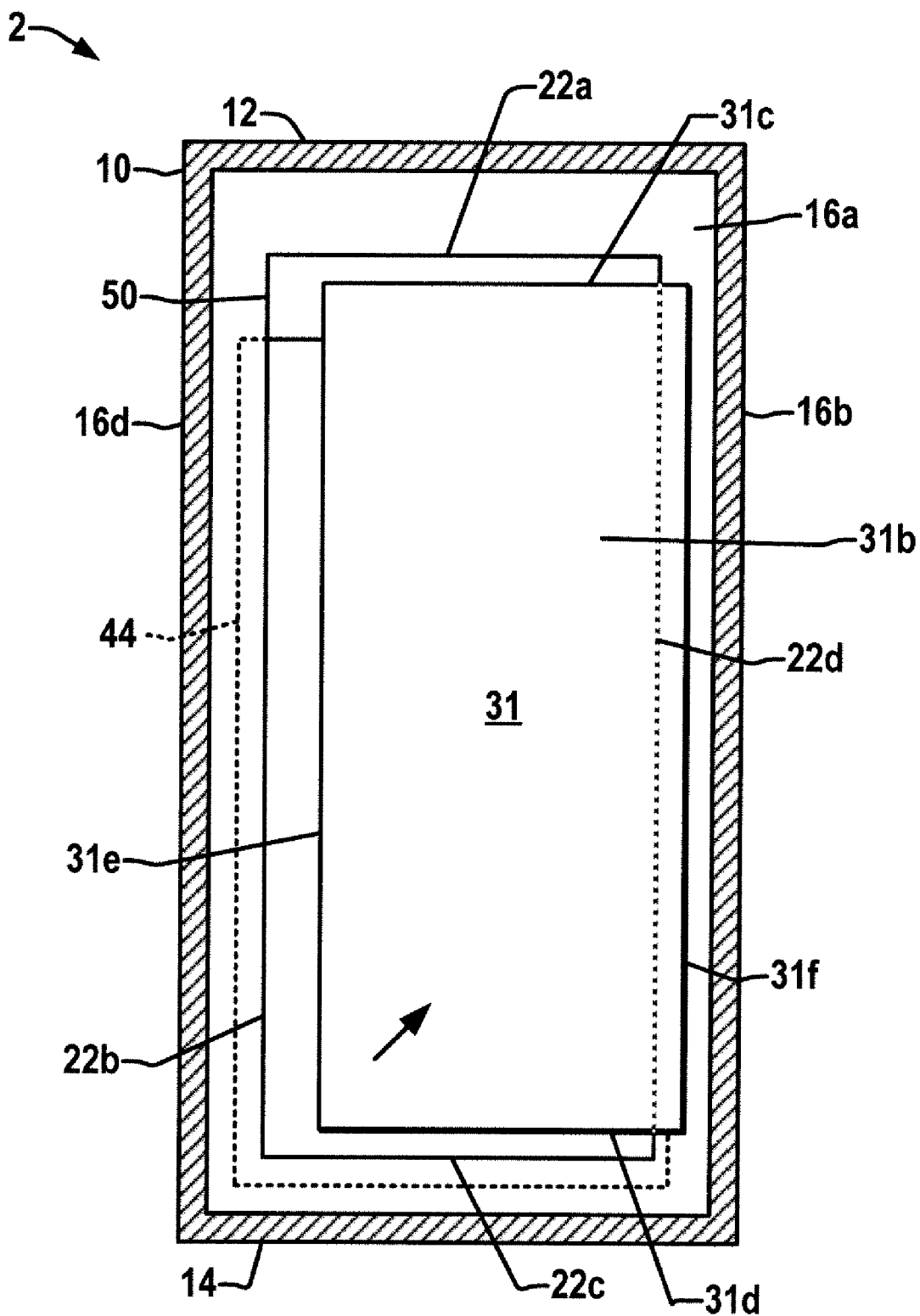

As shown in FIG. 1B, with the closure mechanism 40 still in the closed position, movement of the handle 42 from the first handle position toward the second handle position (rotation upward in this embodiment) causes the mechanism 40 to translate the inner door 31 away from the inner face 17a of the enclosure front side 16a, wherein the illustrated mechanism 40 includes translation structures 41a and 41b mounted to the inner door 31 and the outer panel 44, respectively. As further illustrated in FIGS. 1C and 1D, further movement of the handle 42 to the second handle position (e.g., 90 degrees rotation to a horizontal position) causes the closure mechanism 40 to translate the inner door 31 laterally and vertically (e.g., up and to the right at an angle of about 45 degrees in the rear view of FIG. 1D) such that the front face 31a of the inner door 31 faces the inner face 17a of the enclosure front side 16a along only the left edge 22d of the opening 22.

Figure 1E:
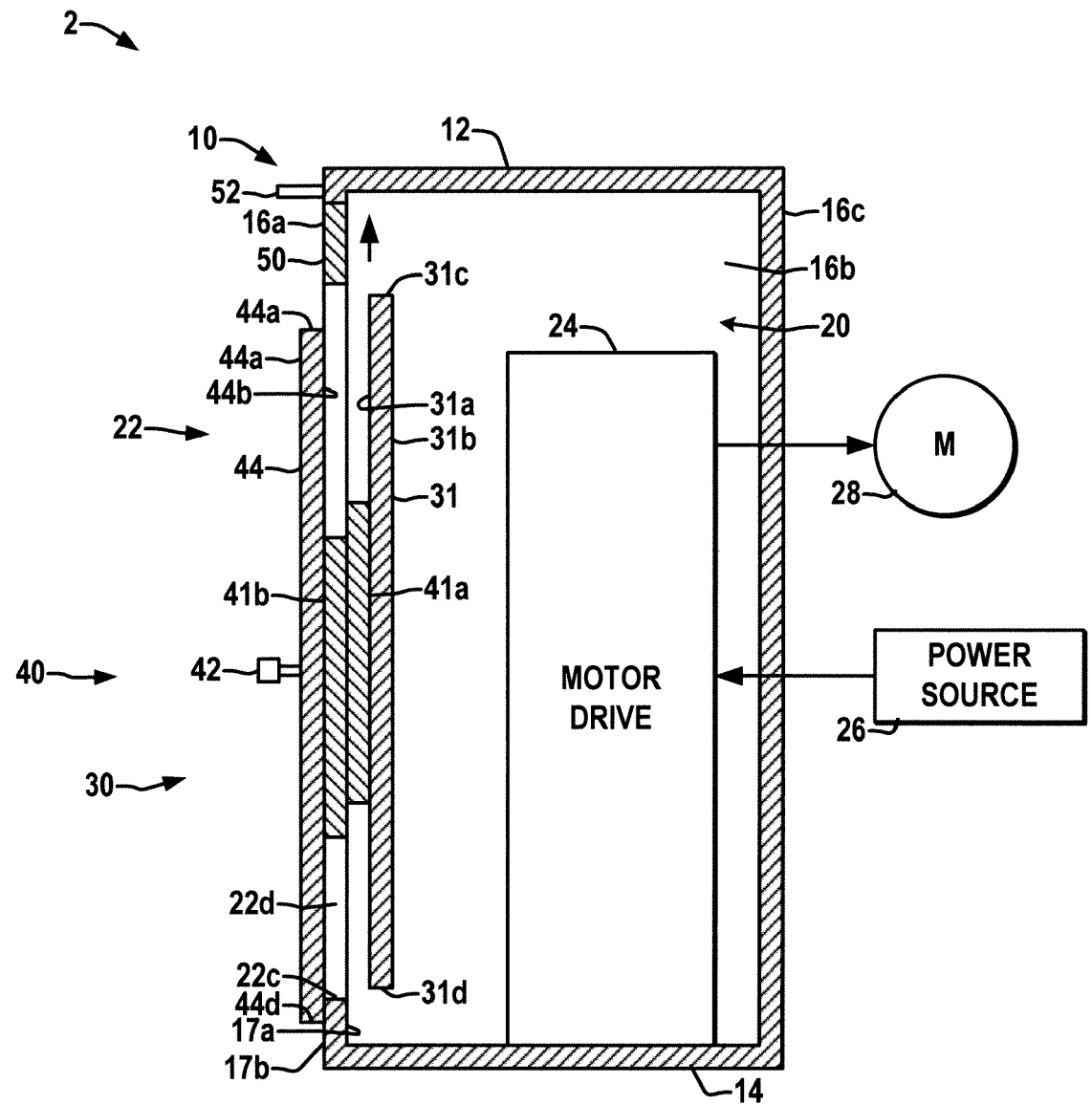
FIG. 1E is a partial sectional rear elevation view showing the system of FIGS. 1A-1D in which an upper closure member is slid upward using a grab handle to clear the top of the inner door.
Figure 1F:
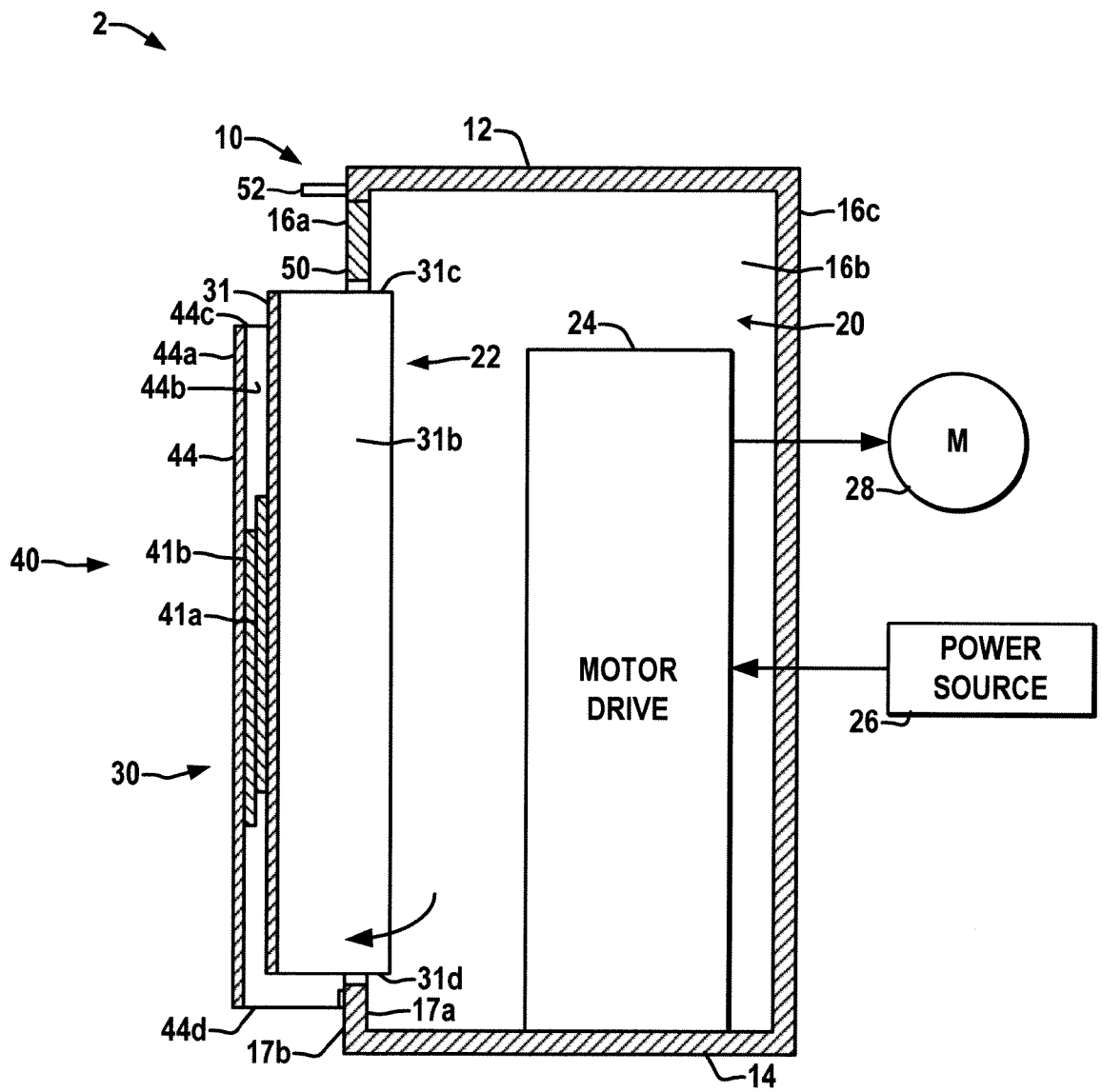
FIG. 1F is a partial sectional side elevation view illustrating the system of FIGS. 1A-1E with the protective door system pivoted toward an open position with the outer panel and inner doors extending through the enclosure opening.

The exemplary protective door system 30 further includes a closing member 50 slidably mounted to the enclosure 10 proximate the top side 22a of the opening 22, as well as a grab handle 52 coupled to the closing member 50. As best shown in FIG. 1E, the grab handle 52 is operable when the closure mechanism 40 is in the closed position and the handle 42 is in the second (e.g., up) position to slide the closing member 50 from a first (down) closing member position (FIGS. 1A-1D) in which the lower portion of the closing member 50 faces or abuts the upper portion of the front face 31a of the inner door 31, to a second (up) position in which the inner door 31 (even in its raised position) clears the closing member 50. At this point, the inner door 31 only faces the front side 16a of the enclosure 10 along the hinged (left) side proximate the pivotal coupling of the closure mechanism 40 to the enclosure 10. Thus, as shown in FIG. 1F, the inner door 31 can pivot through the opening 22 as the closure mechanism 40 is pivoted from the closed position to the open position.

Reversing the above steps provides for closure of the panel 44 and inner door 31 via the mechanism 40, by pivoting the mechanism 40 to seat the outer panel 44 against the enclosure front side 16a, lowering the closure member 50 using the grab handle 52, and rotating the handle 42 downward again to the first handle position, thereby translating the inner door 31 down and to the right (in a direction opposite to that depicted in FIG. 1D), and translating the inner door 31 forward to face or abut the inner face 17a of the enclosure front side 16a as shown in FIG. 1A. The exemplary system 30 therefore provides for inner protection when closed via the inner door 31 being obstructed from outward movement by facing and/or abutting the inner edges of the front side 16a around three sides of the opening 22 and the lower end of the closure member to mitigate inadvertent opening of the enclosure 10 even when internal pressure in the interior 20 of the enclosure 10 rises. Furthermore, the system 30 advantageously provides a simple to operate mechanism 40 that does not require adjustment during manufacturing or in the field, and does not require expensive component parts, thereby reducing cost compared with conventional approaches.

FIGS. 2A-9B illustrate another exemplary enclosure 110 with a protective door system 130 in accordance with the present disclosure, including a top 112, a bottom 114, and a front side 116a, a back side 116c, and left and right sides 116b and 116d, respectively, defining an interior 120 in which a motor drive or other electrical system may be located. The enclosure front side 116a has an inner face 117a and an outer face 117b, as well as a rectangular opening 122 with top, left, bottom, and right edges 122a-122d, respectively, where the enclosure 110 can be opened and closed using a protective door system 130 with an inner door 131 and a closure mechanism 140 hingedly mounted proximate to the left side 116b of the enclosure 110 for selectively covering and uncovering the opening 122.

The protective door system 130 includes an inner door 131 having front and rear faces 131a and 131b, respectively, as well as an inner door top 131c, bottom 131d, and two sides 131e and 131f. System 130 further comprises a closure mechanism 140 including first and second brackets 141A and 141b and a slide bracket 141c, along with an outer panel 144 as best shown in FIGS. 6A-7B. In this embodiment, the first bracket 141a is mounted to the outer face 131b of the inner door 131, and the second bracket 141b is mounted to the inner face 144b of the outer panel 144. The slide bracket 144c is slidingly engaged to the first and second brackets 141a and 141b and operatively coupled with the handle 142 to move relative to the brackets 141a and 141b as the handle 142 is moved to and between a lower first handle position and a second (up) handle position.

Figure 2A:
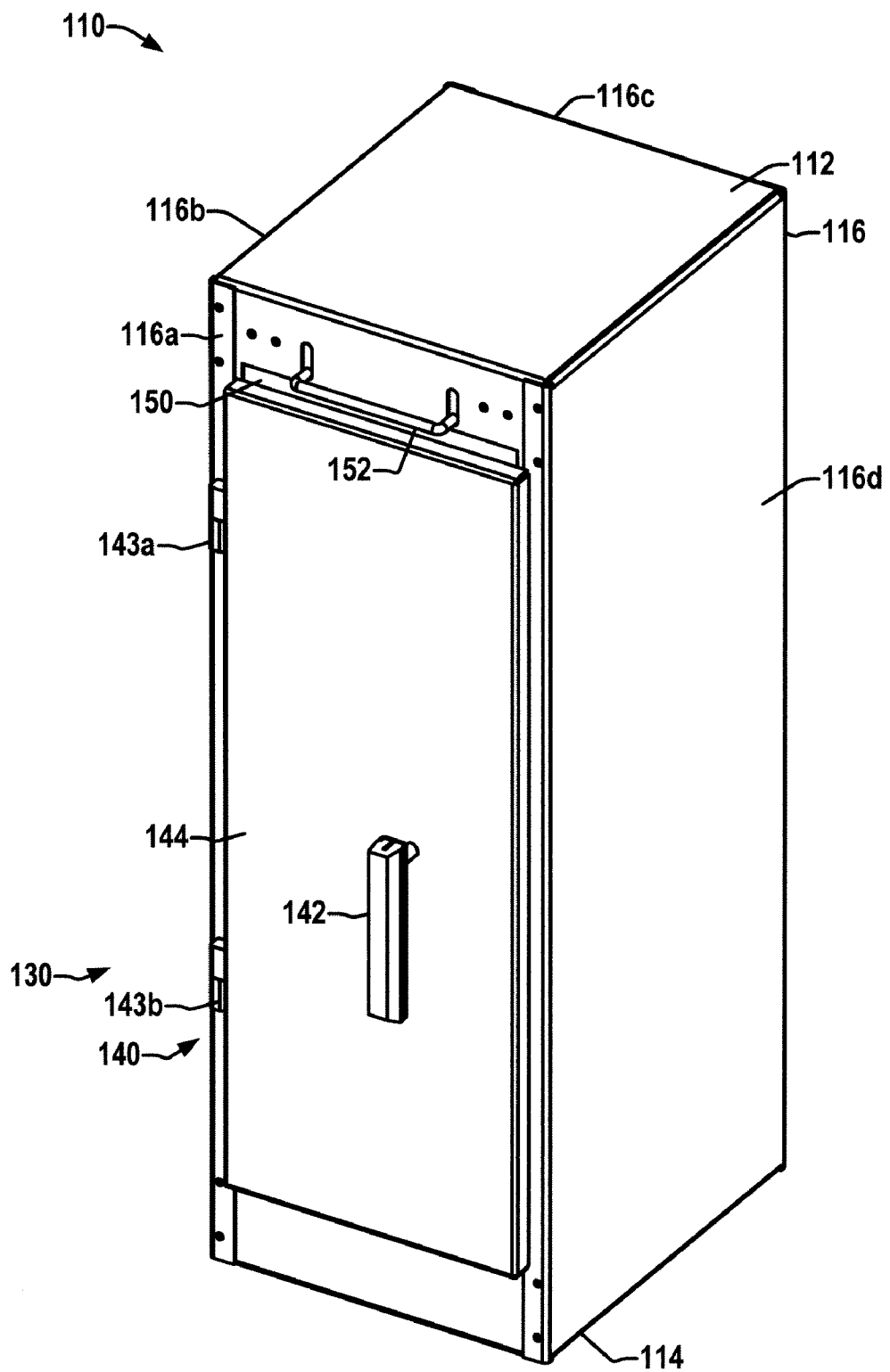
FIGS. 2A-2C are perspective top, plan, and side elevation views, respectively, illustrating another exemplary enclosure with a protective door system in accordance with various aspects of the disclosure in a first condition with an externally accessible handle in a first down position to hold an inner door in a closed position abutting three sides of the door opening and abutting a lower surface of a slidable upper closure member.
Figure 2B:
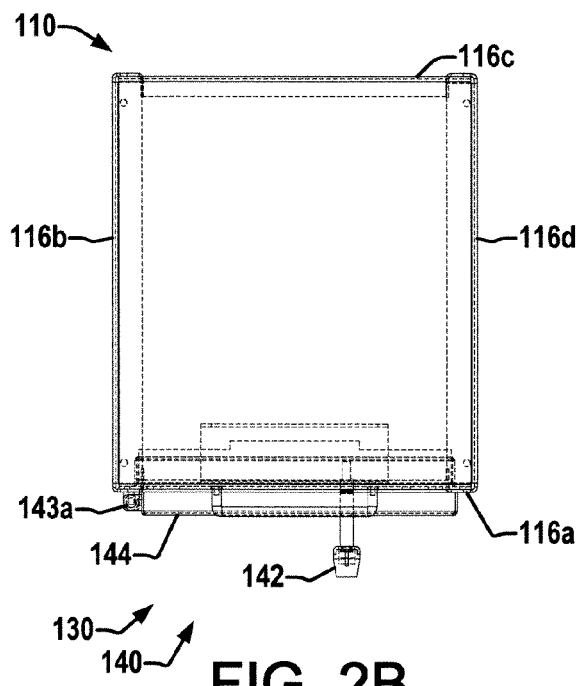
Figure 2C:
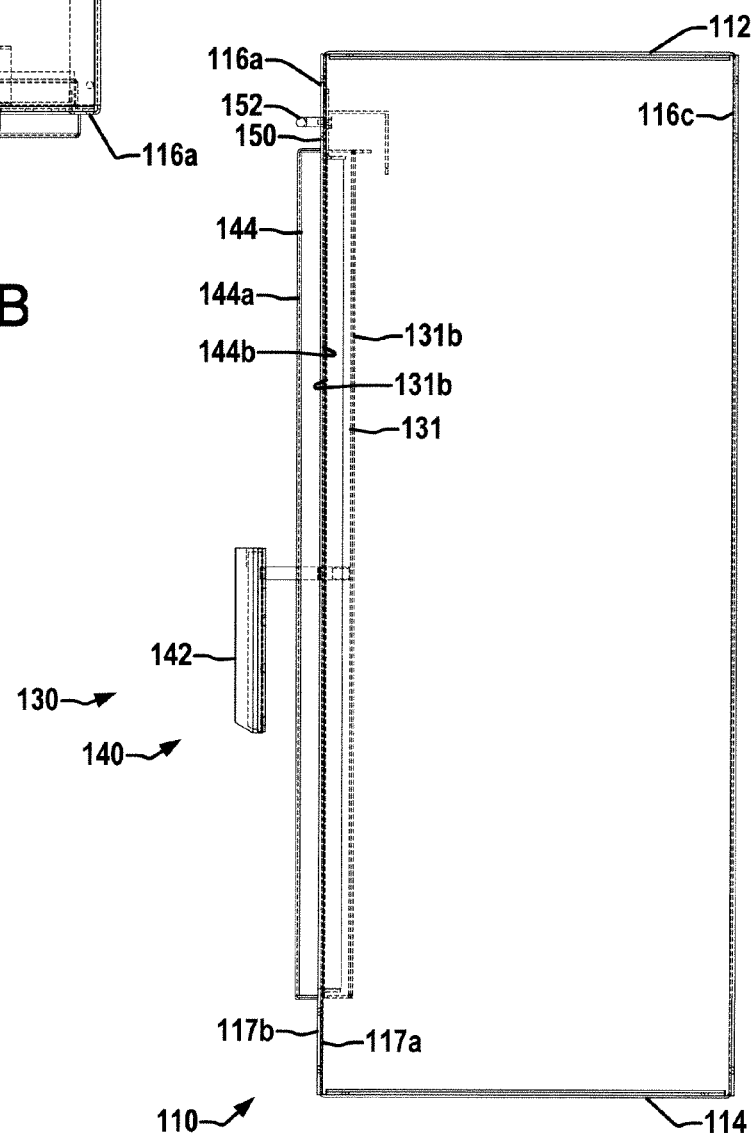

The inner door 131 is located in a closed position shown in FIGS. 2A-2C in which the outer portions of the front face 131a of the inner door 131 face or abut the edges of the enclosure front face 117a along three sides 122b, 122c, and 122d of the opening 122 and further face or abut the lower edge of a closure member 150 shown in its lowered position in FIGS. 2A-4C. As shown in FIGS. 3A-3C, the inner door 131 can be moved from the closed position by rotating the handle 142 from the first (down) position using the closure mechanism 140 through the cooperative arrangement and interaction of the brackets 141. The closure mechanism 140 is pivotally connected the enclosure 110 via upper and lower hinges 143a and 143b, respectively, proximate the left edge 122d of the opening 120 for pivotal movement of the mechanism 140 to and between a closed position (e.g., FIGS. 2A-3C) in which the inner door 131 is entirely within the enclosure interior 120, and an open position (FIGS. 4A-5C) wherein at least a portion of the inner door 131 is pivoted through the opening 122 to extend at least partially outside the enclosure 110.

The exemplary closure mechanism 140 includes an outer panel 144 having front and rear faces 141a and 141b, respectively, as well as a top 144c, a bottom 144d, and two sides 144e and 144f, where the outer panel 144 is pivotally connected to the enclosure 110 via the hinges 143 for pivotal movement between the closed and open positions. In the closed position, portions of the rear face 144b of the outer panel 144 face or abut portions of the outer face 117b of the enclosure front side 116a along the four edges of the opening 122. In the open position, the outer panel 144 is pivoted away from the enclosure front side 116a to allow access to the enclosure interior 120 through the opening 122, as best shown in FIGS. 4A-5C. The closure mechanism 140 is operated by the externally mounted rotatable handle 142 that can be moved by an operator to and between a first (down) position and a second position (rotated up approximately 90 degrees) when the closure mechanism 140 is in the closed position as shown in FIGS. 2A-3C.

When the handle 142 is in the first position (FIGS. 2A-2C), the closure mechanism 140 positions the inner door 131 such that the lower and side peripheral edge portions of the front face 131a of the inner door 131 face or abut portions of the inner face 117a of the enclosure front side 116a along three of the four edges of the opening 122. The door system 130 further includes a closing member 150 slidably mounted to the enclosure 110 at the top side 122a of the opening 122, as well as a grab handle 152 which operates the closing member 150. In this condition of FIGS. 2A-3C, the lower end of the closure member 150 abuts or faces the upper portion of the outer surface 131b of the inner door 131, whereby the inner door 131 is blocked from outward movement along all four peripheral edges thereof.

Figure 6A:
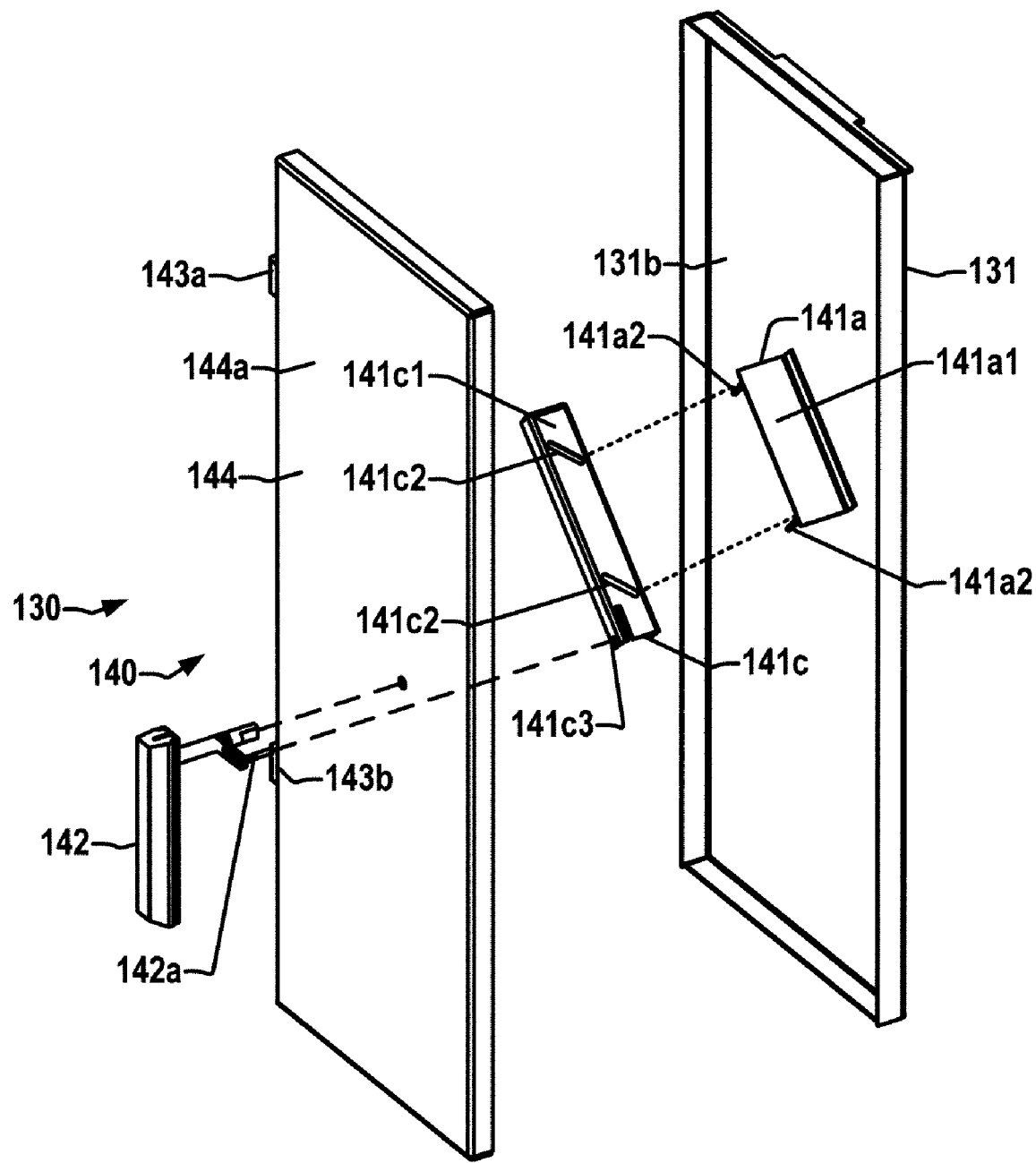
FIGS. 6A and 6B are partial perspective views showing an exemplary closure system in the enclosure of FIGS. 2A-5C including a first bracket mounted to the outer face of the inner door, a second bracket mounted to the inner face of the outer panel, and a slide bracket slidingly engaging the first and second brackets and operatively coupled with the closure mechanism handle.
Figure 6B:
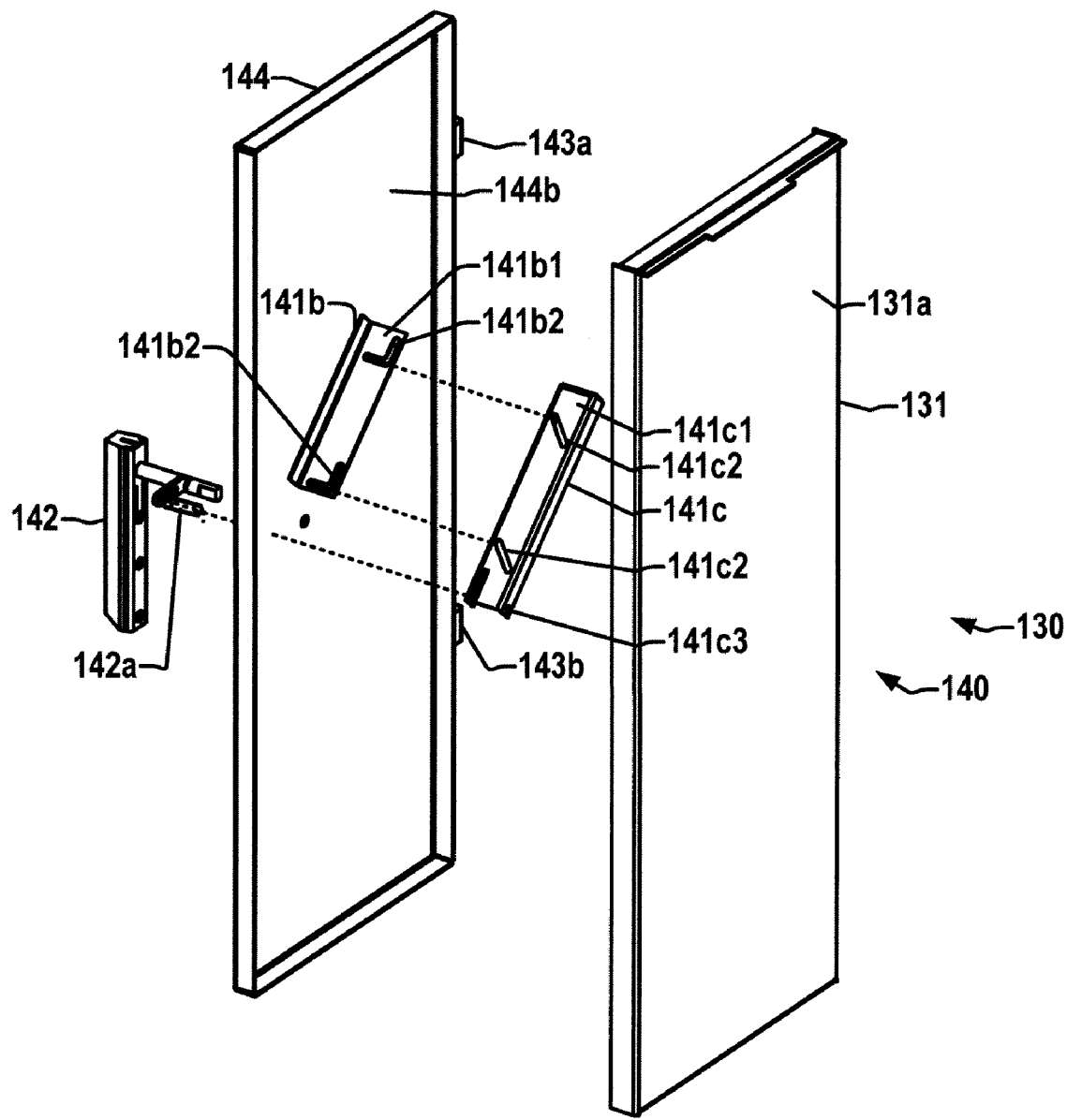

Referring now to FIGS. 3A-3C and 6A-7B, with the closure mechanism 140 still in the closed position, if the handle 142 is rotated counter clockwise from the first handle position toward the second handle position, the closure mechanism 140 translates the inner door 131 away from the inner face 117a of the enclosure front side 116a. As best shown in FIG. 6A, the closure mechanism 140 is comprised of the first bracket 141a that includes a first member 141a1 with top and bottom surfaces extending outward from the outer face 131b of the inner door 131 and laterally upward at a 45 degree angle, and one or more pins 141a2 extending downward at a 45 degree angle from the bottom surface of the first member 141a1, where the pins 141a2 extend downward generally perpendicular to the bottom surface of the first member 141a1. Because the first member 141a1 extends at an angle (in this case 45 degrees) relative to the bottom surface of the inner door 131, the pins 141a2 project downward at a 45 degree angle with respect to the bottom surface of the inner door 131. As shown in FIG. 6B, the second bracket 141b includes a second member 141b1 with top and bottom surfaces extending inward from the inner face 144a of the outer panel 144 and laterally upward at a 45 degree angle, where the second member 141b1 is substantially parallel with the first member 141a1 of the first bracket 141a. The second member 141b1, moreover, includes two L-shaped slots, each having a first slot portion extending inward in a direction away from the outer panel 144 and a second slot portion extending upward from the first portion. The slide bracket 141c includes a slide bracket member 141c1 with top and bottom surfaces extending between the outer panel 144 and the inner door 131 and laterally upward at a 45 degree angle with slide bracket slots 141c2 extending at a 45 degree angle away from a first end near the outer panel 144 to a second end near the inner door 131.

In operation, the slide bracket 141c is slidingly positioned above a portion of the top surface of the second bracket 141b and below a portion of the bottom surface of the first bracket 141a, and preferably the brackets 141 include track features or other structures to provide for controlled sliding arrangement whereby the slide bracket 141c slides upward at a 45 degree angle between the first and second brackets 141a and 141b. In the illustrated embodiment, moreover, the pins 141a2 of the first bracket 141a extend through and operatively engage the angled slots 141c2 of the slide bracket 141c and the L-shaped slots 141b2 (FIG. 6B) of the second bracket 141b. In addition, the handle 142 includes a shaft that extends through the outer front panel 144, and an arm laterally disposed from the shaft that includes a pin 142a located inside the front panel 144 that engages with the holes or slots 141c3 of the slide bracket 141c. Thus, rotation of the handle 142 causes the slide bracket 141c to slide relative to the first and second brackets 141a and 141b as the handle 142 is moved from the first handle position to the second handle position.

Figure 3A:
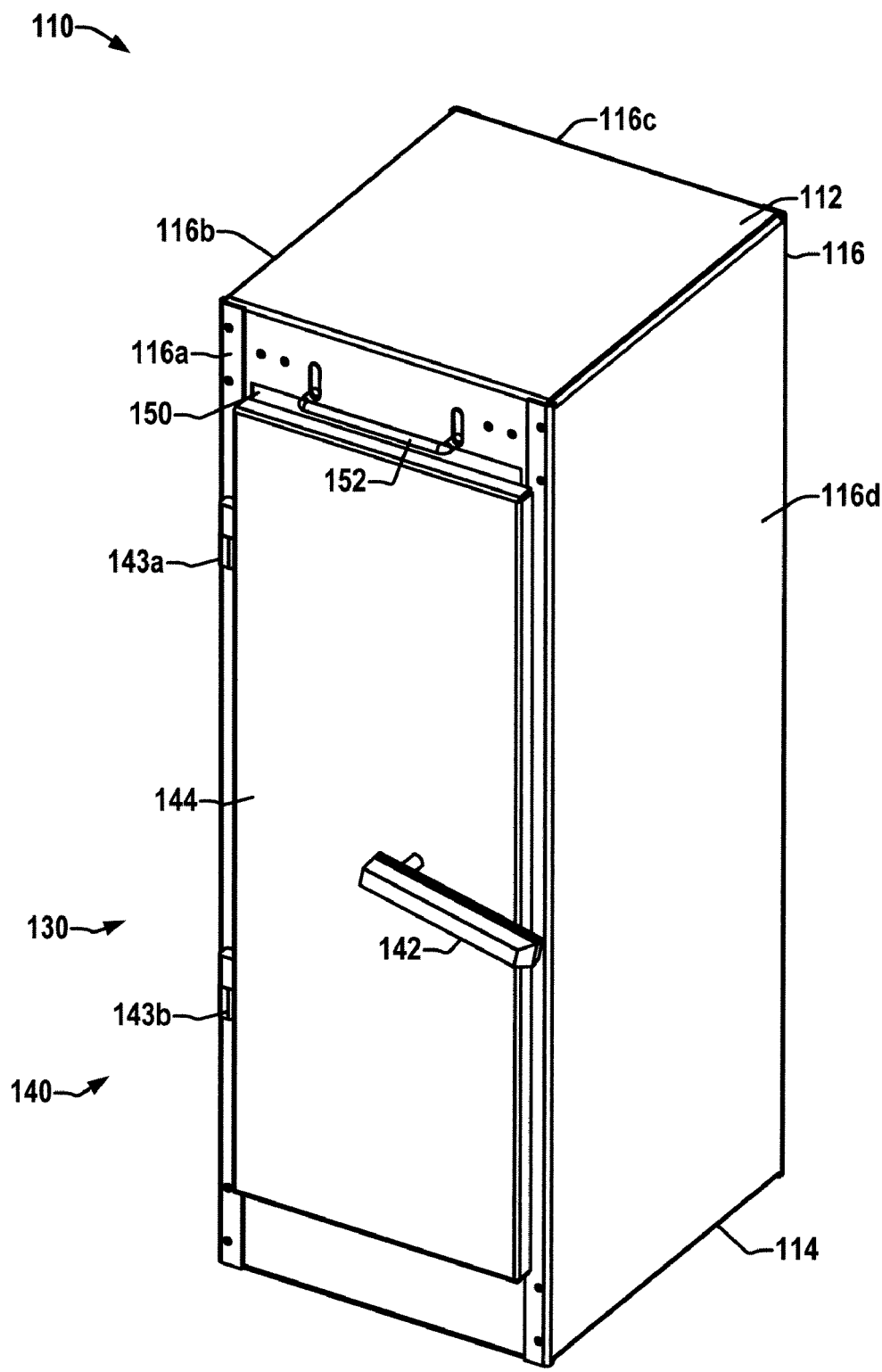
FIGS. 3A-3C are perspective, top plan, and side elevation views, respectively, illustrating the protective door system of FIGS. 2A-2C in a second condition with the handle rotated up toward a second or position to move the inner door back away from the enclosure opening.
Figure 3B:
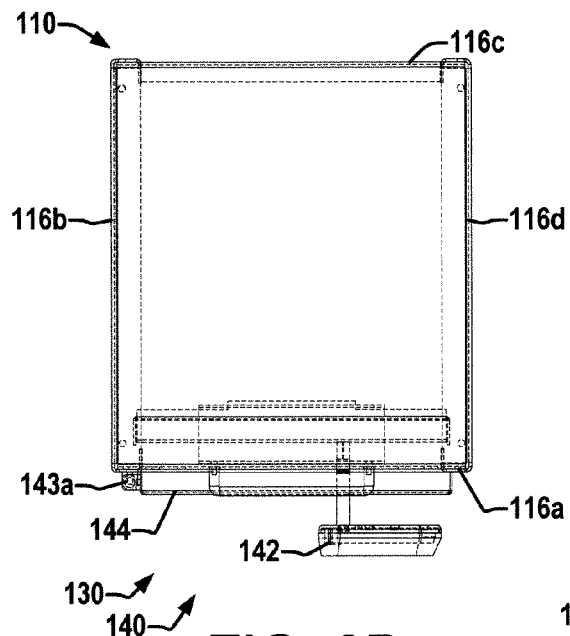
Figure 3C:
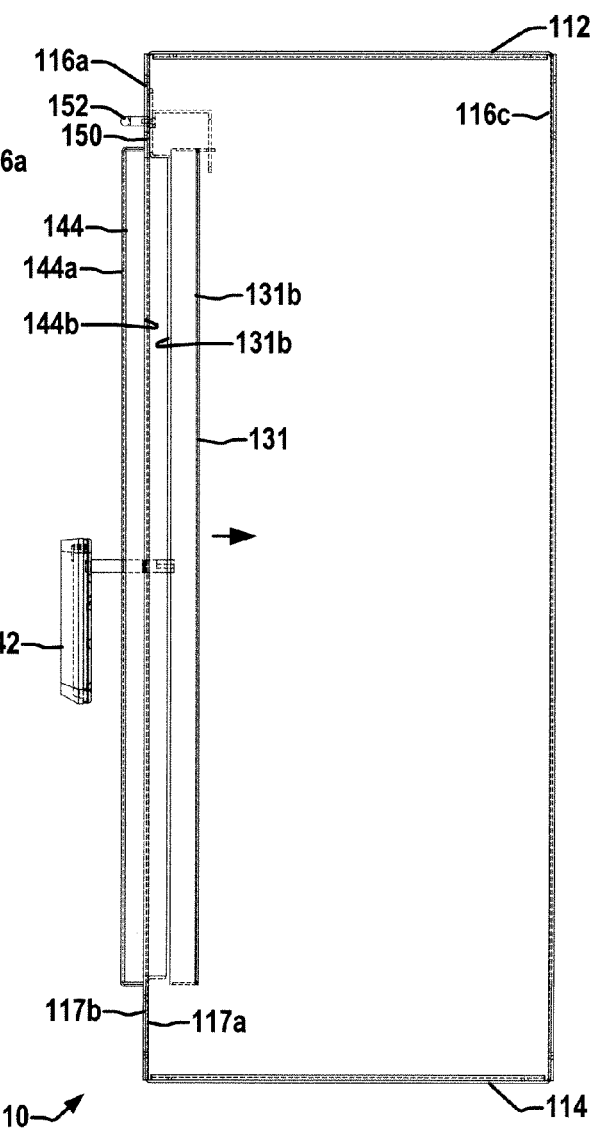

In particular, as shown in FIGS. 3A-3C and 7A, movement of the handle 142 from the first handle position to an intermediate position between the first and second handle positions slides the slide bracket 141c upward at a 45 degree angle with the pins 141a2 of the first bracket 141a translating along the slots 141c2 of the slide bracket 141c and along the first portions of the L-shaped slots 141b2 of the second bracket 141b. This operates to translate the first bracket 141a and hence the inner door 131 away from the inner face 117a of the enclosure front side 116a as best shown in FIG. 3C.

Figure 7A:
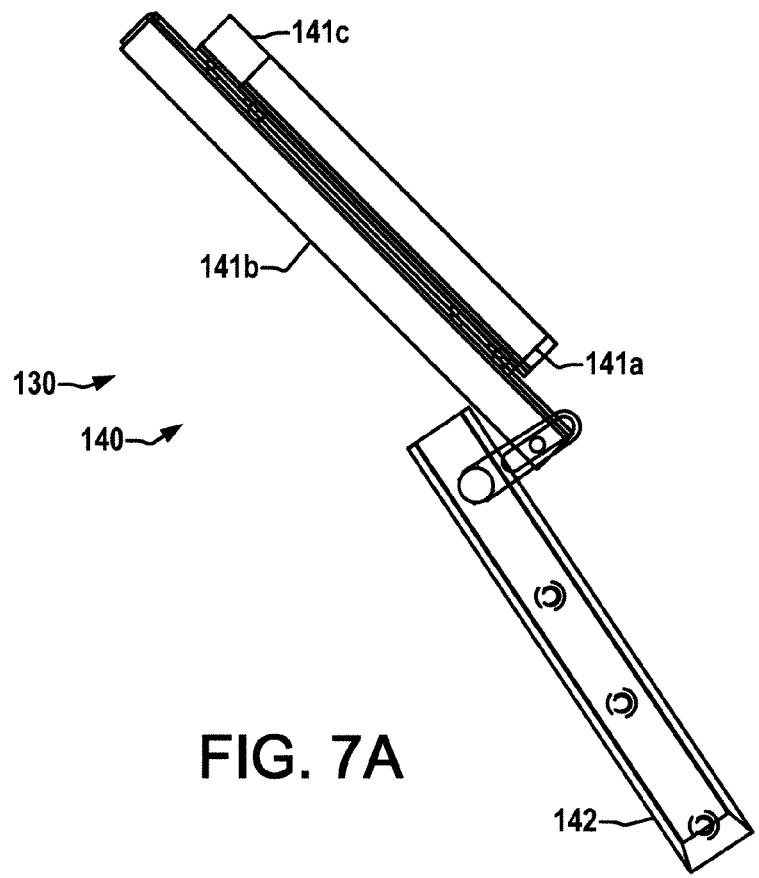
FIGS. 7A and 7B are partial front elevation views showing further details of the closure mechanism handle and brackets of FIGS. 6A and 6B in two exemplary positions between the first and second handle positions.
Figure 7B:
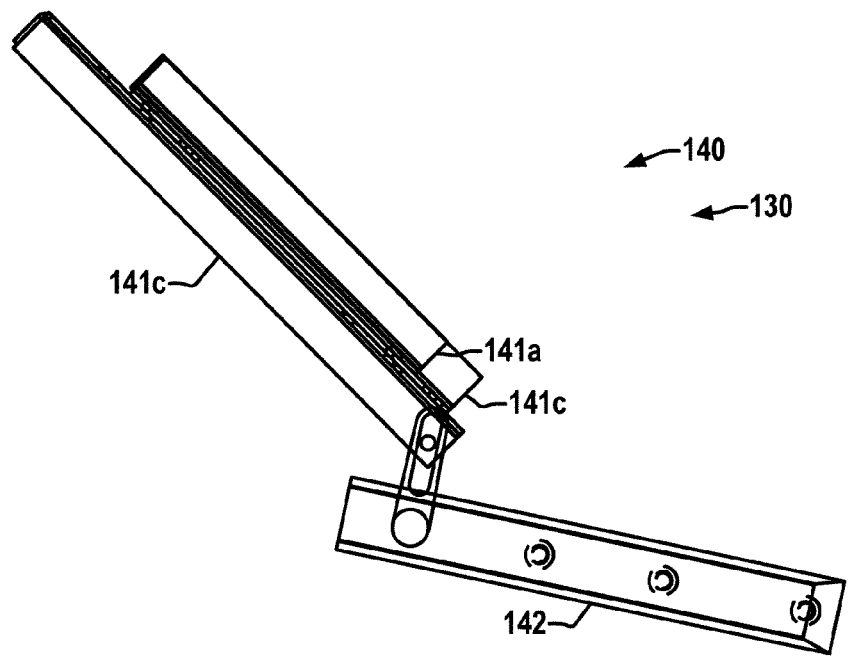
Figure 8A:
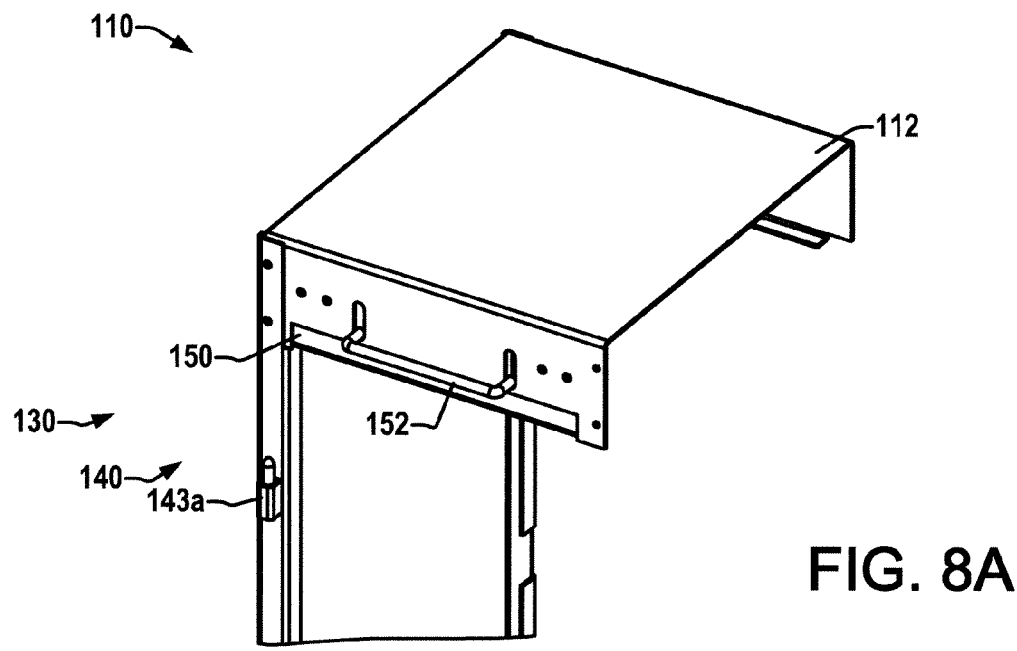
FIGS. 8A and 8B are partial perspective views illustrating an exemplary closure member and grab handle in the enclosure of FIGS. 2A-7B in a first position with the closure member lowered to provide an abutment to the upper edge of the inner door.
Figure 8B:
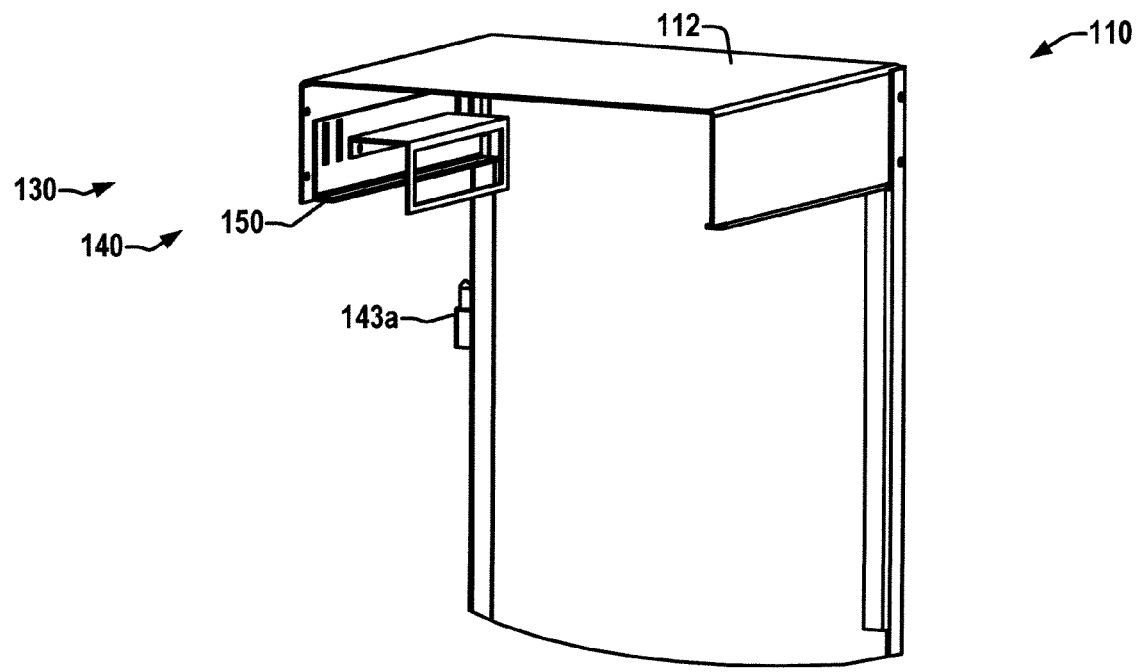
Figure 9A:
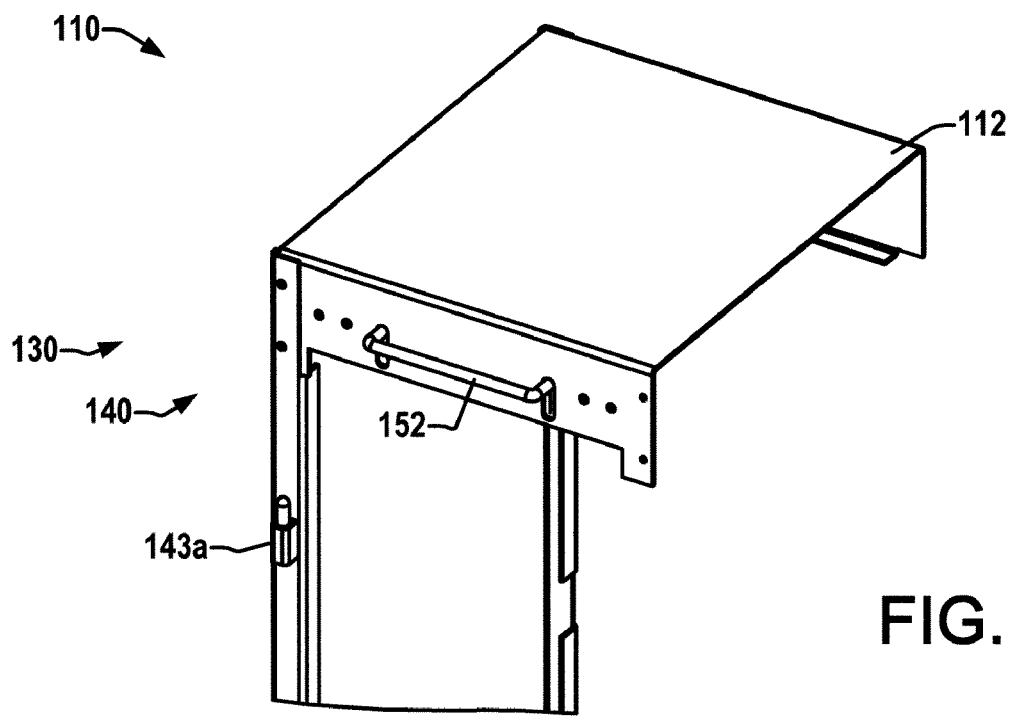
FIGS. 9A and 9B are partial perspective views illustrating the exemplary closure member and grab handle in the enclosure of FIGS. 2A-8B in a second or raised position with the closure member raised to allow passage of the inner door.
Figure 9B:
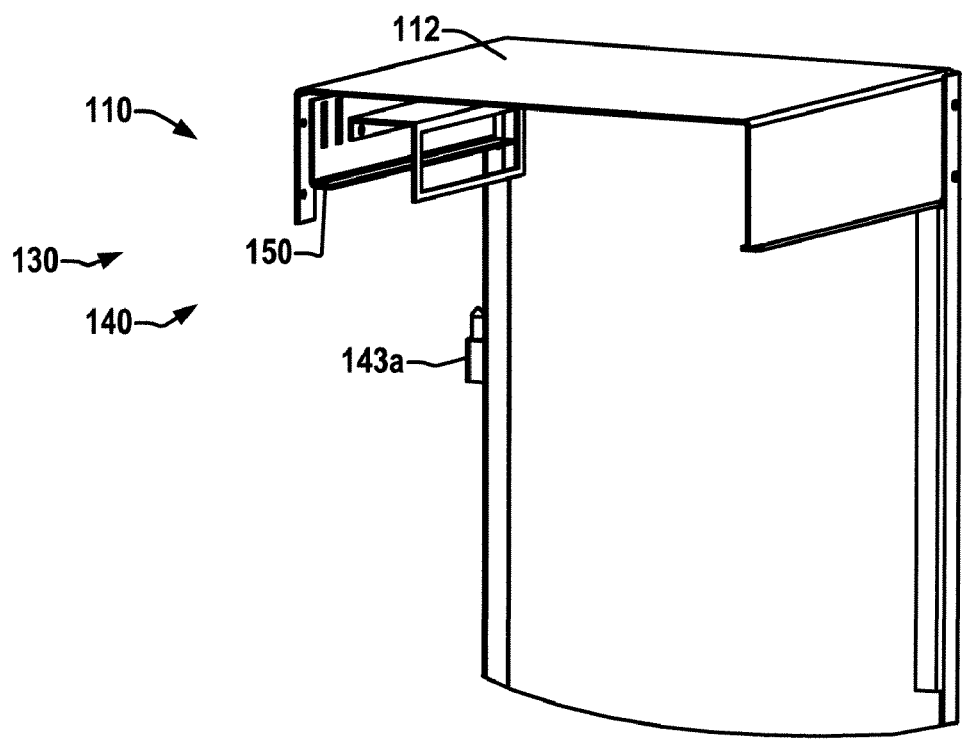

As shown in FIG. 7B, further movement of the handle 142 to the second handle position (e.g., 90 degrees counter clockwise rotation) slides the slide bracket 141c further upward at the angle with the pins 141a2 translating along the second portions of the L-shaped slots 141b2 to move the first bracket 141a and the inner door 131 laterally toward the left enclosure side 116b and vertically upward such that the front face 131b of the inner door 131 faces the inner face 117a of the enclosure front side 116a along only one edge of the opening 122.

Figure 4A:
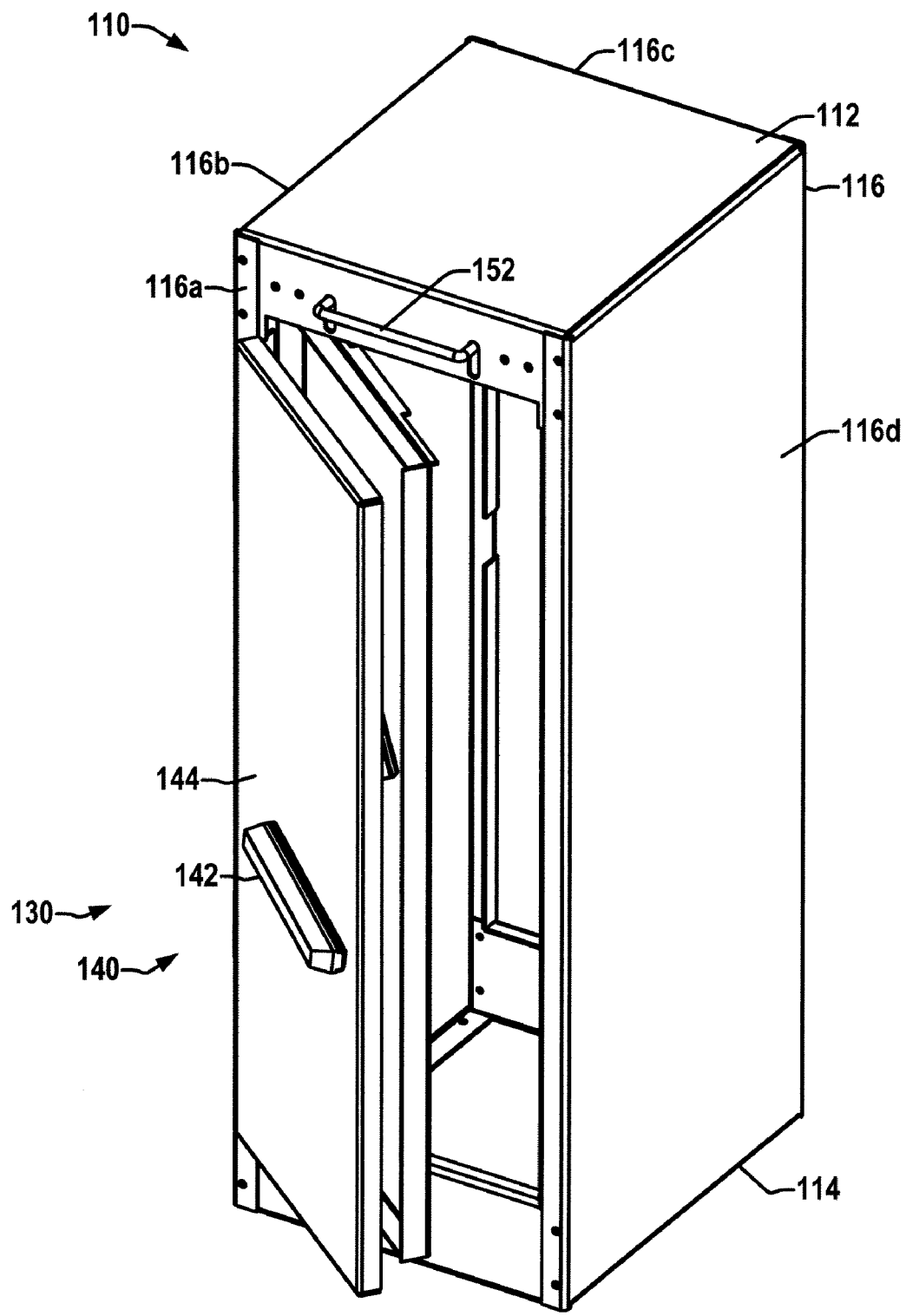
FIGS. 4A-4C are perspective, top plan, and side elevation views, respectively, illustrating the protective door system of FIGS. 2A-3C in a subsequent condition with the closure member slid upward using the grab handle and with the door system pivoted partially open.
Figure 4B:
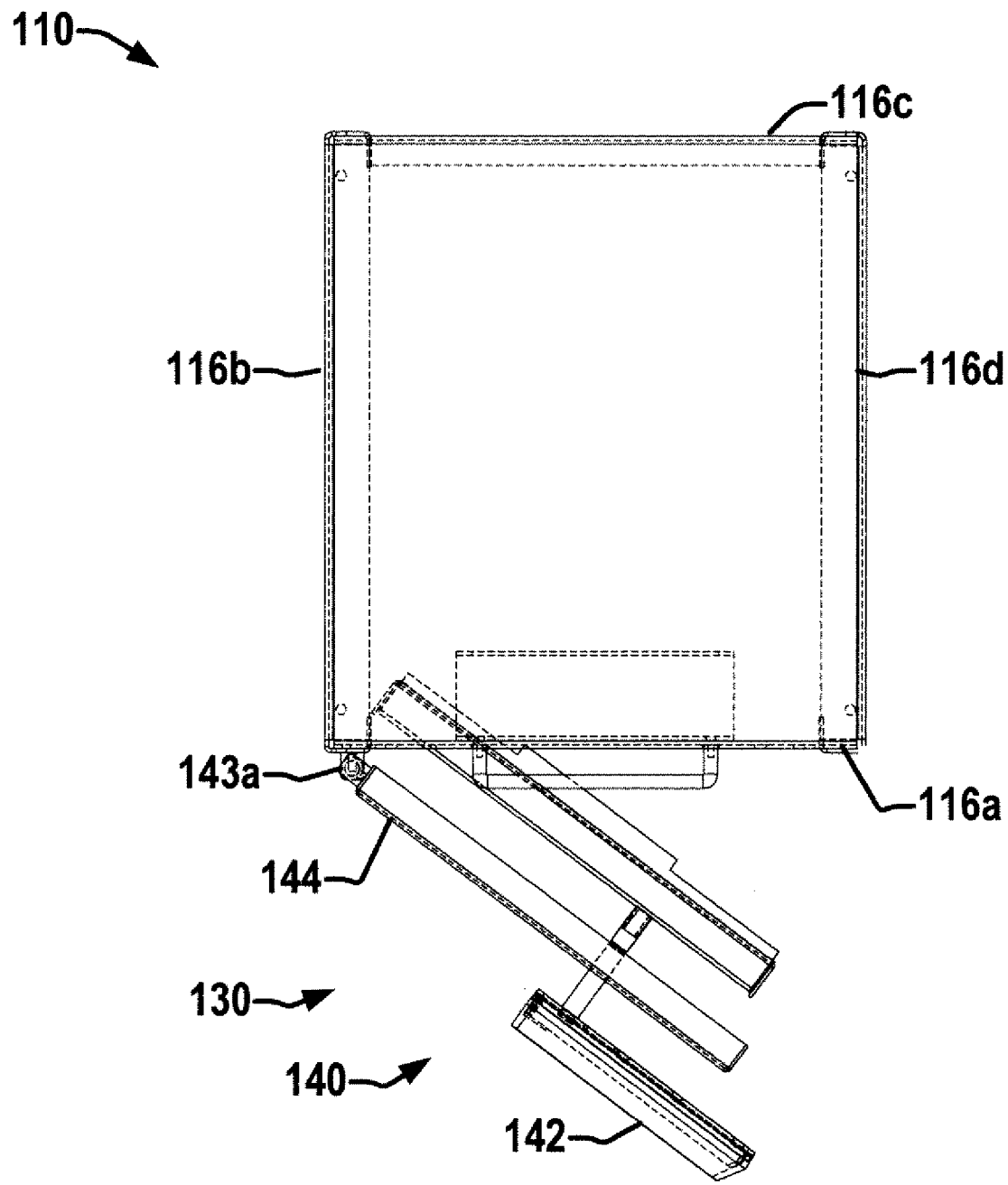
Figure 4C:
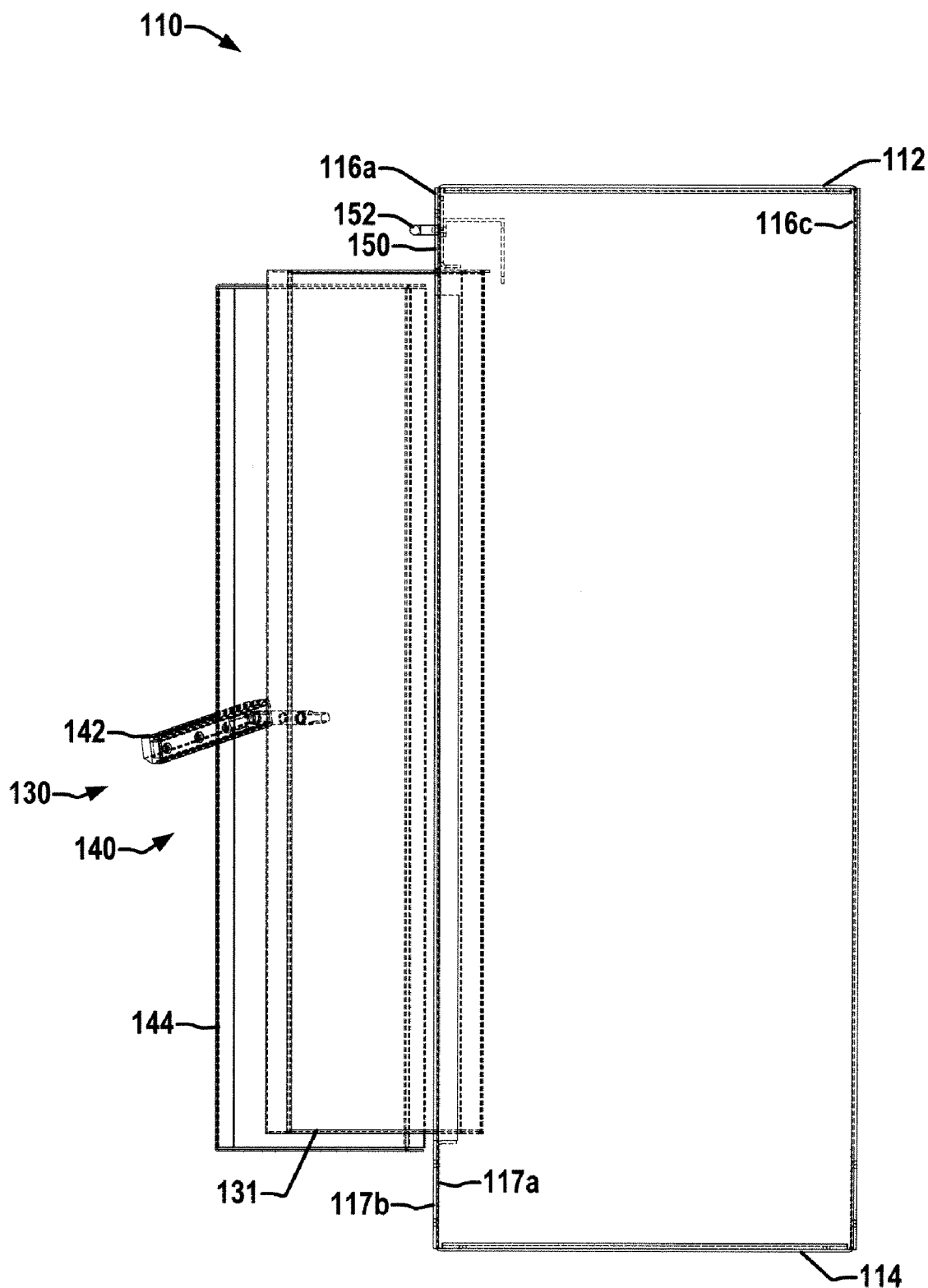
Figure 5A:
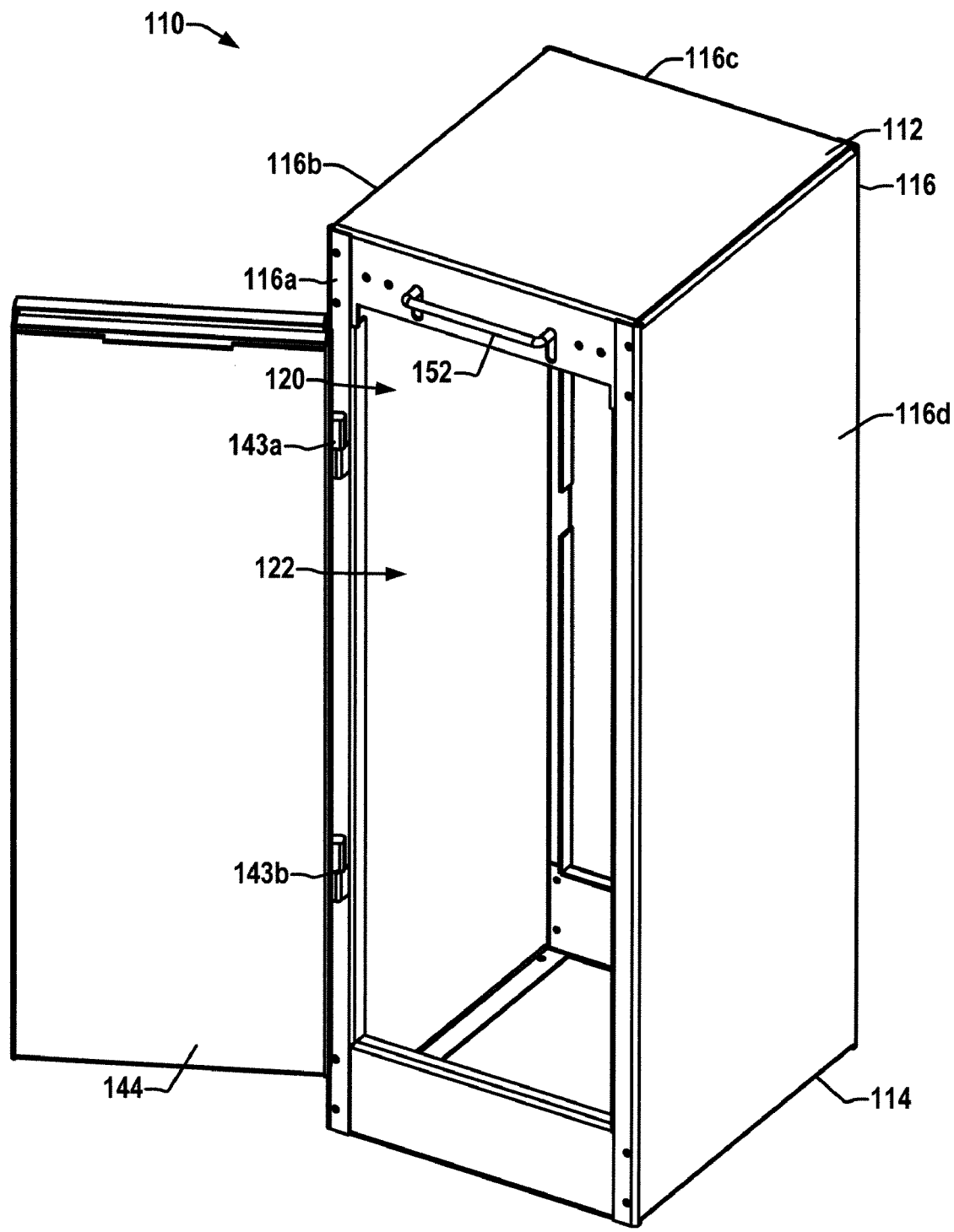
FIGS. 5A-5C are perspective, top plan, and side elevation views, respectively, illustrating the protective door system of FIGS. 2A-4C in a subsequent condition with the protective door system pivoted fully open.
Figure 5B:
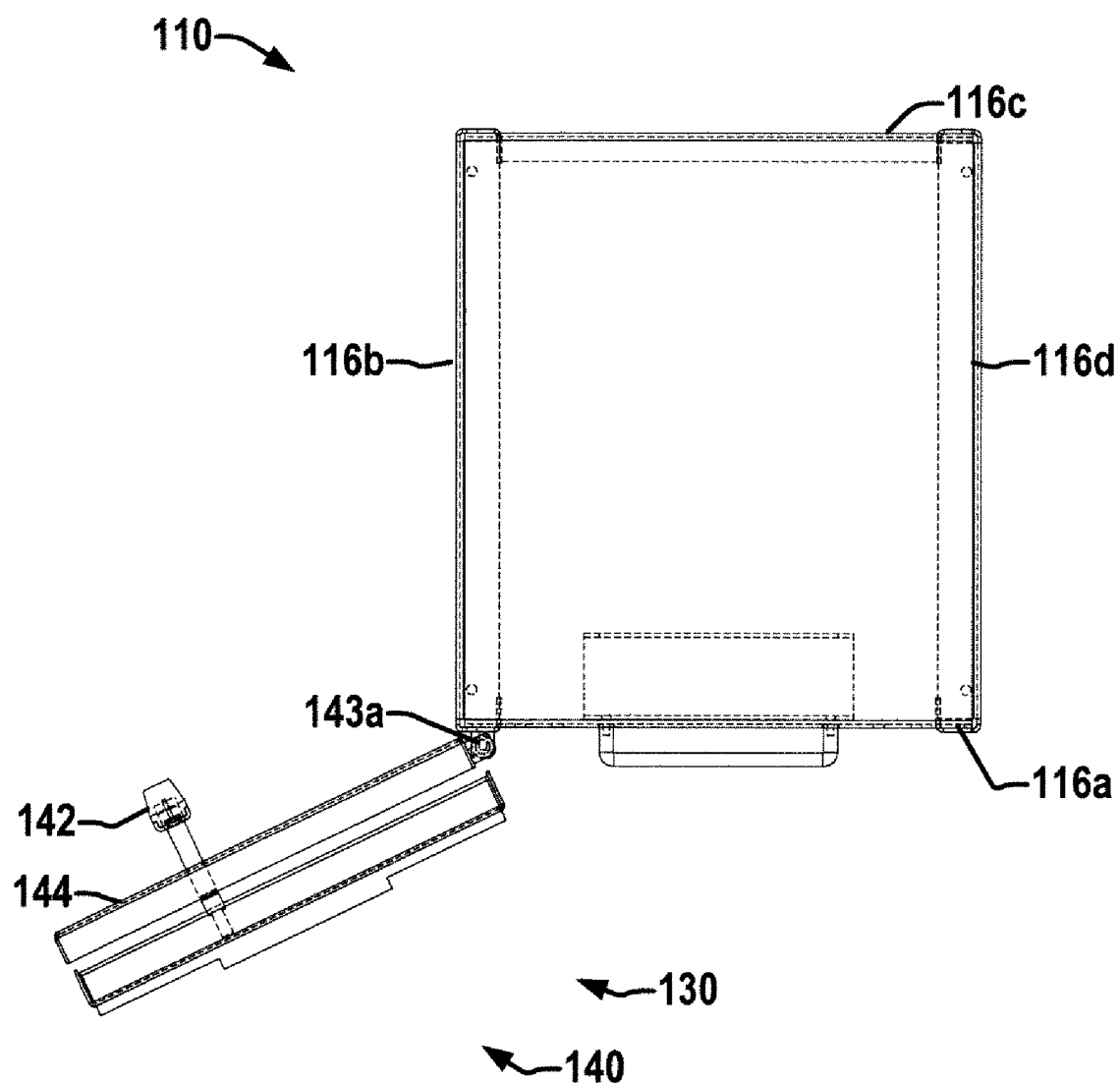
Figure 5C:
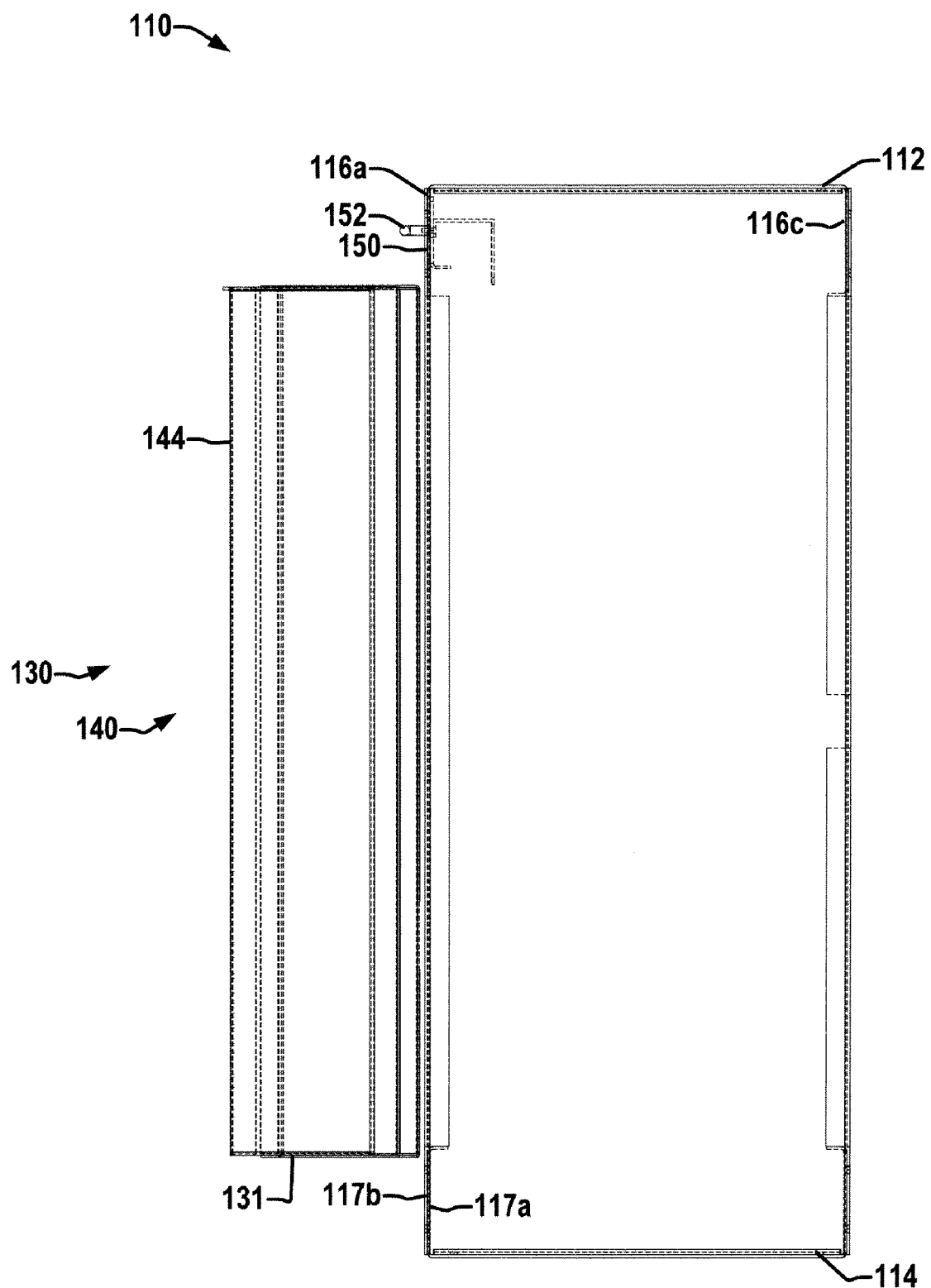

Referring now to FIGS. 4A-5C and 8A-9B, with the closure mechanism 140 remaining in the closed position, the grab handle 152 is translated upward from a first (lowered) position (FIGS. 8A and 8B) with the closure member 150 lowered to a raised position (FIGS. 4A-5C and 9A-9B so as to slide the closing member 150 out of the way of the upper portion of the inner door 131. The closure mechanism 140 may then be pivoted on the hinges 143 from the closed position to an open position as shown in FIGS. 4A-4C whereby the inner door 131 partially extends through the enclosure opening 122.

The enclosure may again be closed by reversing the above steps, including pivoting the mechanism 140 to again seat the outer panel 144 against the enclosure front side 116a, and then lowering the closure member 150 using the grab handle 152. The handle 142 is then rotated clockwise back to the first (down) position to thereby translate the inner door 131 down and to the right at a 45 degree angle, and the forward to face or abut the inner face 117a of the enclosure front side 116a.

The above implementations are merely examples of several possible embodiments of various aspects of the present invention, wherein equivalent alterations and/or modifications will occur to others skilled in the art upon reading and understanding this specification and the annexed drawings. In particular regard to the various functions performed by the above described components assemblies, devices, systems, circuits, and the like, the terms including a reference to a "means" used to describe such components are intended to correspond, unless otherwise indicated, to any component, such as hardware, software, or combinations thereof, which performs the specified function of the described component i.e., that is functionally equivalent, even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A motor drive system, comprising:
    an enclosure including a top, a bottom, a plurality of sides extending vertically from the top to the bottom and defining an interior, the plurality of sides including a front side with inner and outer faces and a rectangular opening comprising four edges and providing access to the interior of the enclosure;
    a motor drive located within the interior of the enclosure and operative to receive power from an external power source and to operate an external electric motor;
    a protective door system operatively coupled with the enclosure for selectively covering and uncovering the opening, the door system comprising an inner door having front and rear faces, a top, a bottom, and two sides, and a closure mechanism operatively coupled to the inner door and pivotally connected to the enclosure proximate an edge of the opening for pivotal movement between a closed position in which the inner door is positioned inside the interior and an open position in which at least a portion of the inner door is pivoted through the opening to extend at least partially outside the enclosure, the closure mechanism comprising an externally mounted handle movable with the closure mechanism in the closed position between first and second handle positions, the closure mechanism positioning the inner door in the first handle position such that portions of the front face of the inner door face or abut portions of the inner face of the enclosure front side along three of the four edges of the opening to inhibit outward movement of the inner door, the closure mechanism in the closed position operable as the handle is moved from the first handle position to the second handle position to translate the inner door away from the inner face of the enclosure front side and to translate the inner door laterally and vertically such that the front face of the inner door faces the inner face of the enclosure front side along only one edge of the opening to allow a portion of the inner door to pivot through the opening to extend at least partially outside the enclosure as the closure mechanism is pivoted from the closed position to the open position.

2. The motor drive system of claim 1, wherein the protective door system further comprises a closing member slidably mounted to the enclosure proximate the fourth side of the edge of the opening and a grab handle coupled to the closing member, the grab handle operable when the closure mechanism is in the closed position and the handle is in the second position to slide the closing member from a first closing member position in which a portion of closing member faces or abuts a portion of the front face of the inner door to a second position in which the inner door clears the closing member to allow the inner door to pivot through the opening as the closure mechanism is pivoted from the closed position to the open position.

3. The motor drive system of claim 2, wherein the closure mechanism further comprises an outer panel having front and rear faces, a top, a bottom, and two sides, the outer panel being pivotally connected to the enclosure proximate an edge of the opening for pivotal movement between the closed position of the closure mechanism in which portions of the rear face of the outer panel face or abut portions of the outer face of the enclosure front side along the four edges of the opening, and the open position of the closure mechanism in which the outer panel is pivoted away from the enclosure front side to allow access to the enclosure interior through the opening.

4. The motor drive system of claim 3, wherein the closure mechanism comprises a first bracket mounted to the outer face of the inner door; a second bracket mounted to the inner face of the outer panel; and a slide bracket slidingly engaging the first and second brackets and operatively coupled with the handle of the closure mechanism to move relative to the first and second brackets as the handle is moved to and between the first and second handle positions.

5. The motor drive system of claim 4, wherein the first bracket includes a first member with top and bottom surfaces extending outward from the outer face of the inner door and laterally upward at a non-zero angle, and at least one pin extending downward at a non-zero angle from the bottom surface of the first member;
   wherein the second bracket includes a second member with top and bottom surfaces extending inward from the inner face of the outer panel and laterally upward at a non-zero second angle, the second member of the second bracket and the first member of the first bracket being substantially parallel, the second member including at least one L-shaped slot with a first slot portion extending inward in a direction away from the outer panel and a second slot portion extending upward from the first portion at the second angle;
   wherein the slide bracket includes a slide bracket member with top and bottom surfaces extending between the outer panel and the inner door and laterally upward at a non-zero third angle with at least one slide bracket slot extending at an angle away from a first end proximate the outer panel to a second end proximate the inner door;
   wherein the slide bracket is slidingly positioned above a portion of the top surface of the second bracket and below a portion of the bottom surface of the first bracket with the pin of the first bracket extending through and operatively engaging the slot of the slide bracket and the L-shaped slot of the second bracket; and
   wherein the handle extends through the outer panel and includes an arm inside the outer panel that engages with the slide bracket and operates to slide the slide bracket relative to the first and second brackets as the handle is moved from the first handle position to the second handle position.

6. The motor drive system of claim 5, wherein movement of the handle from the first handle position to an intermediate position between the first and second handle positions slides the slide bracket upward at an angle with the pin of the first bracket translating along the slot of the slide bracket and along the first portion of the L-shaped slot of the second bracket to translate the first bracket and the inner door away from the inner face of the enclosure front side; and
   wherein further movement of the handle from the intermediate position to second handle position slides the slide bracket further upward at the angle with the pin of the first bracket translating along the second portion of the L-shaped slot of the second bracket to translate the inner door laterally and vertically such that the front face of the inner door faces the inner face of the enclosure front side along only one edge of the opening to allow a portion of the inner door to pivot through the opening to extend at least partially outside the enclosure as the closure mechanism is pivoted from the closed position to the open position.

7. The motor drive system of claim 6, wherein the handle is pivotally mounted to the closure mechanism and rotatable between the first and second handle positions.

8. The motor drive system of claim 5, wherein the handle is pivotally mounted to the closure mechanism and rotatable between the first and second handle positions.

9. The motor drive system of claim 1, wherein the handle is pivotally mounted to the closure mechanism and rotatable between the first and second handle positions.

10. The motor drive system of claim 1, wherein the closure mechanism further comprises an outer panel having front and rear faces, a top, a bottom, and two sides, the outer panel being pivotally connected to the enclosure proximate an edge of the opening for pivotal movement between the closed position of the closure mechanism in which portions of the rear face of the outer panel face or abut portions of the outer face of the enclosure front side along the four edges of the opening, and the open position of the closure mechanism in which the outer panel is pivoted away from the enclosure front side to allow access to the enclosure interior through the opening.

11. The motor drive system of claim 10, wherein the handle is pivotally mounted to the closure mechanism and rotatable between the first and second handle positions.

12. A protective door system for allowing selective access to an interior of an enclosure by covering or uncovering an opening in a front side of the enclosure, the system comprising:
   an inner door having front and rear faces, a top, a bottom, and two sides; and
   a closure mechanism operatively coupled to the inner door and pivotally connected to the enclosure proximate an edge of the opening for pivotal movement between a closed position in which the inner door is positioned inside the interior and an open position in which at least a portion of the inner door is pivoted through the opening to extend at least partially outside the enclosure, the closure mechanism comprising:
      an externally mounted handle movable with the closure mechanism in the closed position between first and second handle positions, the closure mechanism positioning the inner door in the first handle position such that portions of the front face of the inner door face or abut portions of the inner face of the enclosure front side along three of four edges of the opening to inhibit outward movement of the inner door, the closure mechanism in the closed position operable as the handle is moved from the first handle position to the second handle position to translate the inner door away from the inner face of the enclosure front side and to translate the inner door laterally and vertically such that the front face of the inner door faces the inner face of the enclosure front side along only one edge of the opening to allow a portion of the inner door to pivot through the opening to extend at least partially outside the enclosure as the closure mechanism is pivoted from the closed position to the open position;
      a closing member slidably mounted to the enclosure proximate the fourth edge of the opening; and
      a grab handle coupled to the closing member, the grab handle operable when the closure mechanism is in the closed position and the handle is in the second position to slide the closing member from a first closing member position in which a portion of closing member faces or abuts a portion of the front face of the inner door to a second position in which the inner door clears the closing member to allow the inner door to pivot through the opening as the closure mechanism is pivoted from the closed position to the open position.

13. The protective door system of claim 12, wherein the closure mechanism further comprises an outer panel having front and rear faces, a top, a bottom, and two sides, the outer panel being pivotally connected to the enclosure proximate an edge of the opening for pivotal movement between the closed position of the closure mechanism in which portions of the rear face of the outer panel face or abut portions of the outer face of the enclosure front side along the four edges of the opening, and the open position of the closure mechanism in which the outer panel is pivoted away from the enclosure front side to allow access to the enclosure interior through the opening.

14. The protective door system of claim 13, wherein the closure mechanism comprises a first bracket mounted to the outer face of the inner door; a second bracket mounted to the inner face of the outer panel; and a slide bracket slidingly engaging the first and second brackets and operatively coupled with the handle of the closure mechanism to move relative to the first and second brackets as the handle is moved to and between the first and second handle positions.

15. The protective door system of claim 14, wherein the first bracket includes a first member with top and bottom surfaces extending outward from the outer face of the inner door and laterally upward at a non-zero angle, and at least one pin extending downward at a non-zero angle from the bottom surface of the first member;

wherein the second bracket includes a second member with top and bottom surfaces extending inward from the inner face of the outer panel and laterally upward at a non-zero second angle, the second member of the second bracket and the first member of the first bracket being substantially parallel, the second member including at least one L-shaped slot with a first slot portion extending inward in a direction away from the outer panel and a second slot portion extending upward from the first portion at the second angle;

wherein the slide bracket includes a slide bracket member with top and bottom surfaces extending between the outer panel and the inner door and laterally upward at a non-zero third angle with at least one slide bracket slot extending at an angle away from a first end proximate the outer panel to a second end proximate the inner door;

wherein the slide bracket is slidingly positioned above a portion of the top surface of the second bracket and below a portion of the bottom surface of the first bracket with the pin of the first bracket extending through and operatively engaging the slot of the slide bracket and the L-shaped slot of the second bracket; and wherein the handle extends through the outer panel and includes an arm inside the outer panel that engages with the slide bracket and operates to slide the slide bracket relative to the first and second brackets as the handle is moved from the first handle position to the second handle position.

16. The protective door system of claim 15, wherein movement of the handle from the first handle position to an intermediate position between the first and second handle positions slides the slide bracket upward at an angle with the pin of the first bracket translating along the slot of the slide bracket and along the first portion of the L-shaped slot of the second bracket to translate the first bracket and the inner door away from the inner face of the enclosure front side; and wherein further movement of the handle from the intermediate position to second handle position slides the slide bracket further upward at the angle with the pin of the first bracket translating along the second portion of the L-shaped slot of the second bracket to translate the inner door laterally and vertically such that the front face of the inner door faces the inner face of the enclosure front side along only one edge of the opening to allow a portion of the inner door to pivot through the opening to extend at least partially outside the enclosure as the closure mechanism is pivoted from the closed position to the open position.

17. The protective door system of claim 13, wherein the handle is pivotally mounted to the closure mechanism and rotatable between the first and second handle positions.

18. The protective door system of claim 12, wherein the handle is pivotally mounted to the closure mechanism and rotatable between the first and second handle positions.

* * * * *